(12) United States Patent
Savini et al.

(10) Patent No.: US 11,549,210 B2
(45) Date of Patent: Jan. 10, 2023

(54) HYDRAULIC CONTROL DEVICE FOR LIQUID-CONDUCTING APPLIANCES AND SYSTEMS

(71) Applicant: ELTEK S.p.A., Casale Monferrato (IT)

(72) Inventors: Paolo Savini, Casale Monferrato (IT); Daniele Cerruti, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 280 days.

(21) Appl. No.: 16/753,620

(22) PCT Filed: Sep. 27, 2018

(86) PCT No.: PCT/IB2018/057480
§ 371 (c)(1),
(2) Date: Apr. 3, 2020

(87) PCT Pub. No.: WO2019/069186
PCT Pub. Date: Apr. 11, 2019

(65) Prior Publication Data
US 2020/0249704 A1 Aug. 6, 2020

(30) Foreign Application Priority Data
Oct. 6, 2017 (IT) .................. 102017000112681

(51) Int. Cl.
*F16K 31/02* (2006.01)
*D06F 39/08* (2006.01)
(Continued)

(52) U.S. Cl.
CPC .......... *D06F 39/081* (2013.01); *A47L 15/421* (2013.01); *G01F 1/588* (2013.01);
(Continued)

(58) Field of Classification Search
CPC ........ D06F 39/081; D06F 33/47; G01F 1/588; G01F 1/69; G01F 15/005; G01M 3/26; G05D 7/0635; A47L 15/421
(Continued)

(56) References Cited

U.S. PATENT DOCUMENTS 3,097,762 A * 7/1963 Charnota ............. A01G 25/165
222/518
4,425,792 A * 1/1984 Kohama .................. G01F 1/69
73/204.27
(Continued)

FOREIGN PATENT DOCUMENTS

EP 0 599 341 6/1994
EP 1 085 119 3/2001
(Continued)

OTHER PUBLICATIONS

International Search Report and Written Opinion of PCT/IB2018/057480 dated Jan. 18, 2019, 14 pages.

*Primary Examiner* — Minh Q Le
(74) *Attorney, Agent, or Firm* — Nixon & Vanderhye P.C.

(57) ABSTRACT

A hydraulic control device for liquid-conducting appliances and systems is designed for connection between a source of liquid and an appliance or system using the liquid. The hydraulic control device (1) comprises: —a device body (2', 3') having a duct for the liquid (30a, 30b) that extends between an inlet connector (2a) and an outlet connector (3 a); —a flow meter (40, 50) associated to the device body (2\ 3'); and—a valve arrangement (31, 33-37) associated to the device body (2', 3'), including a valve member (31), which is displaceable between an opening position and a closing position of the duct for the liquid (30a, 30b), and a control mechanism (33-37) for controlling the valve member (31). The control mechanism (33-37) is switchable on the basis of a detection made by the flow meter (40, 50) in order to
(Continued)

displace the valve member (31) from the opening position to the closing position of the duct for the liquid (30*a*, 30*b*). The flow meter (40, 50) is a non-mechanical flow meter that includes at least two electrical detection elements (42) that are reachable by liquid that flows in the duct for the liquid (30*a*, 30*b*).

20 Claims, 14 Drawing Sheets

(51) Int. Cl.
*A47L 15/42* (2006.01)
*G01F 1/58* (2006.01)
*G01F 1/69* (2006.01)
*G01F 15/00* (2006.01)
*G01M 3/26* (2006.01)
*G05D 7/06* (2006.01)
*D06F 33/47* (2020.01)

(52) U.S. Cl.
CPC .............. *G01F 1/69* (2013.01); *G01F 15/005* (2013.01); *G01M 3/26* (2013.01); *G05D 7/0635* (2013.01); *D06F 33/47* (2020.02)

(58) Field of Classification Search
USPC ............................... 137/486, 487.5; 4/255.06
See application file for complete search history.

(56) References Cited

U.S. PATENT DOCUMENTS

| | | | | |
|---|---|---|---|---|
| 4,471,655 A * | | 9/1984 | Obayashi | G01F 1/68 73/204.27 |
| 4,726,236 A * | | 2/1988 | Wada | G01F 1/60 73/861.12 |
| 4,774,844 A * | | 10/1988 | Davis | G01F 1/588 73/861.12 |
| 4,790,182 A * | | 12/1988 | Takahashi | H01C 7/02 73/114.34 |
| 5,007,453 A * | | 4/1991 | Berkowitz | G01F 15/003 137/458 |
| 5,020,214 A * | | 6/1991 | Tsuruoka | G01P 5/12 29/613 |
| 6,003,536 A * | | 12/1999 | Polverari | D06F 39/081 68/12.02 |
| 6,397,687 B1 * | | 6/2002 | Garmas | G01F 15/001 73/195 |
| 9,243,941 B2 * | | 1/2016 | Reichart | G01F 1/60 |
| 10,981,804 B2 * | | 4/2021 | Gaj | D06F 39/081 |
| 2001/0038082 A1 * | | 11/2001 | Hines | F16K 31/025 251/129.04 |
| 2006/0245467 A1 * | | 11/2006 | Casella | H04Q 9/00 374/41 |
| 2009/0025486 A1 * | | 1/2009 | Cros | G01F 1/588 73/861.12 |
| 2010/0126282 A1 * | | 5/2010 | Neuburger | G01F 15/14 73/861.12 |
| 2011/0130976 A1 * | | 6/2011 | Lamberti | G01F 25/10 702/45 |
| 2012/0038143 A1 * | | 2/2012 | Shih | G01F 15/005 285/31 |
| 2013/0255798 A1 * | | 10/2013 | McAward | E03B 7/071 137/455 |
| 2014/0069206 A1 * | | 3/2014 | Ayers | G01F 1/588 73/861.12 |
| 2014/0083199 A1 * | | 3/2014 | Rogers | G01F 1/588 73/861.12 |
| 2015/0053019 A1 * | | 2/2015 | Sulzer | G01F 1/586 73/861.12 |
| 2015/0316164 A1 * | | 11/2015 | Sohn | F16K 31/025 251/318 |
| 2017/0052047 A1 * | | 2/2017 | Profeta, Jr. | G01F 1/584 |
| 2018/0274212 A1 * | | 9/2018 | Kuchly | F16K 37/005 |
| 2018/0356267 A1 * | | 12/2018 | Brockhaus | G01F 25/10 |
| 2019/0285444 A1 * | | 9/2019 | Inagaki | G01F 15/00 |
| 2021/0381207 A1 * | | 12/2021 | Brotherton | G01F 15/06 |

FOREIGN PATENT DOCUMENTS

EP         1 798 326        6/2007
WO         2017/017463      2/2017

* cited by examiner

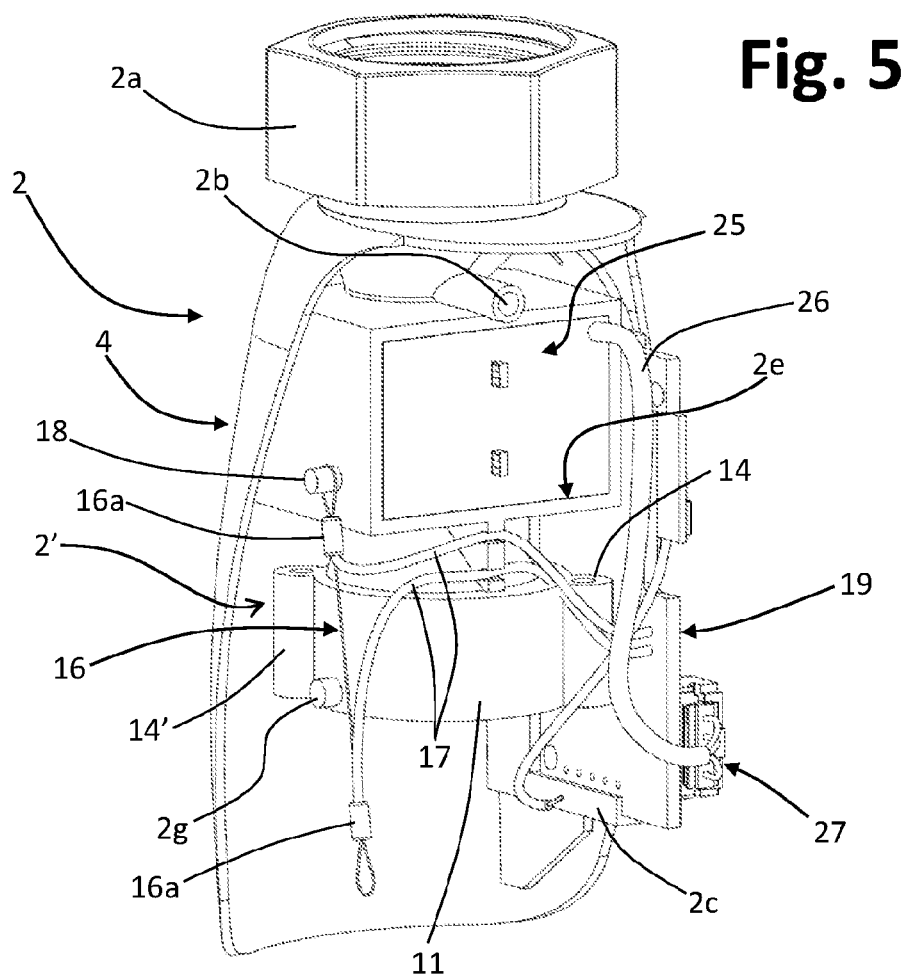
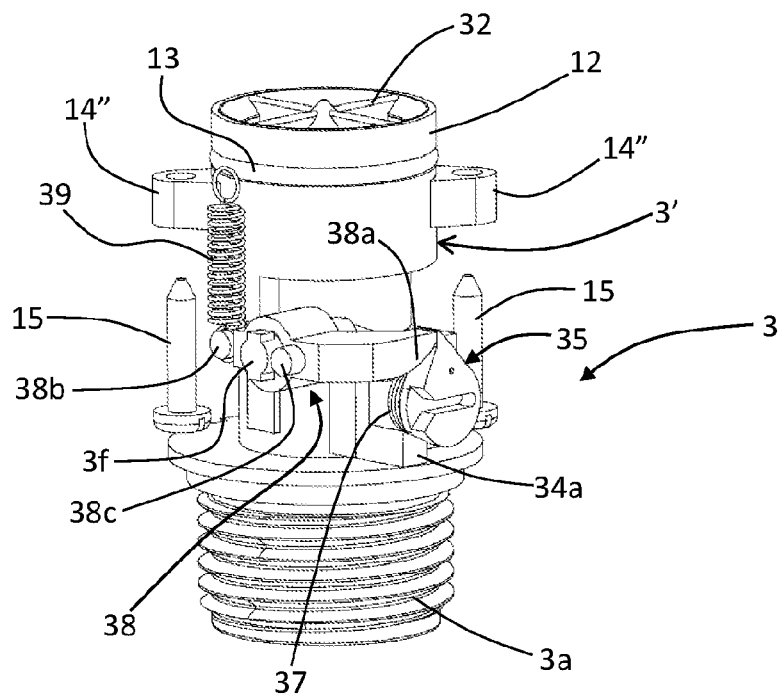
Fig. 5

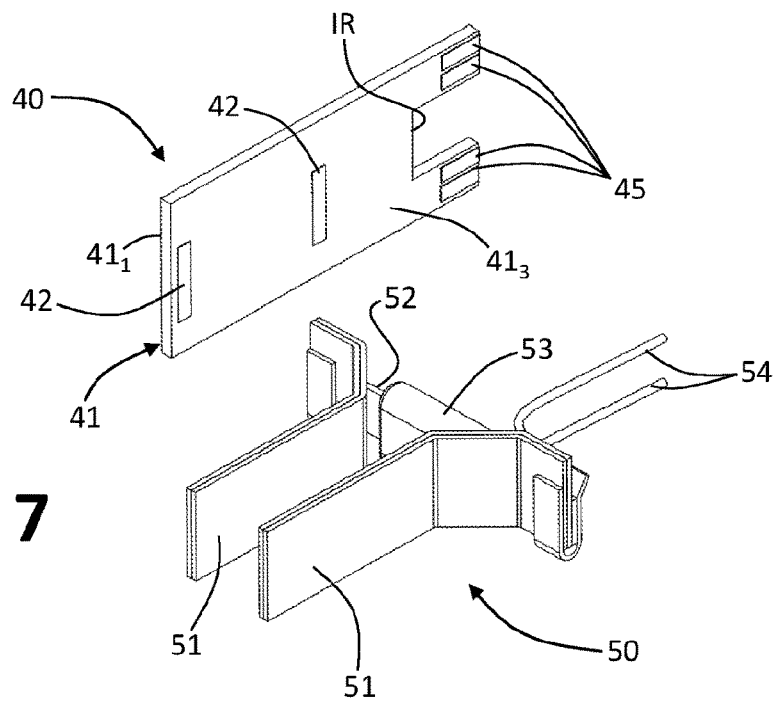
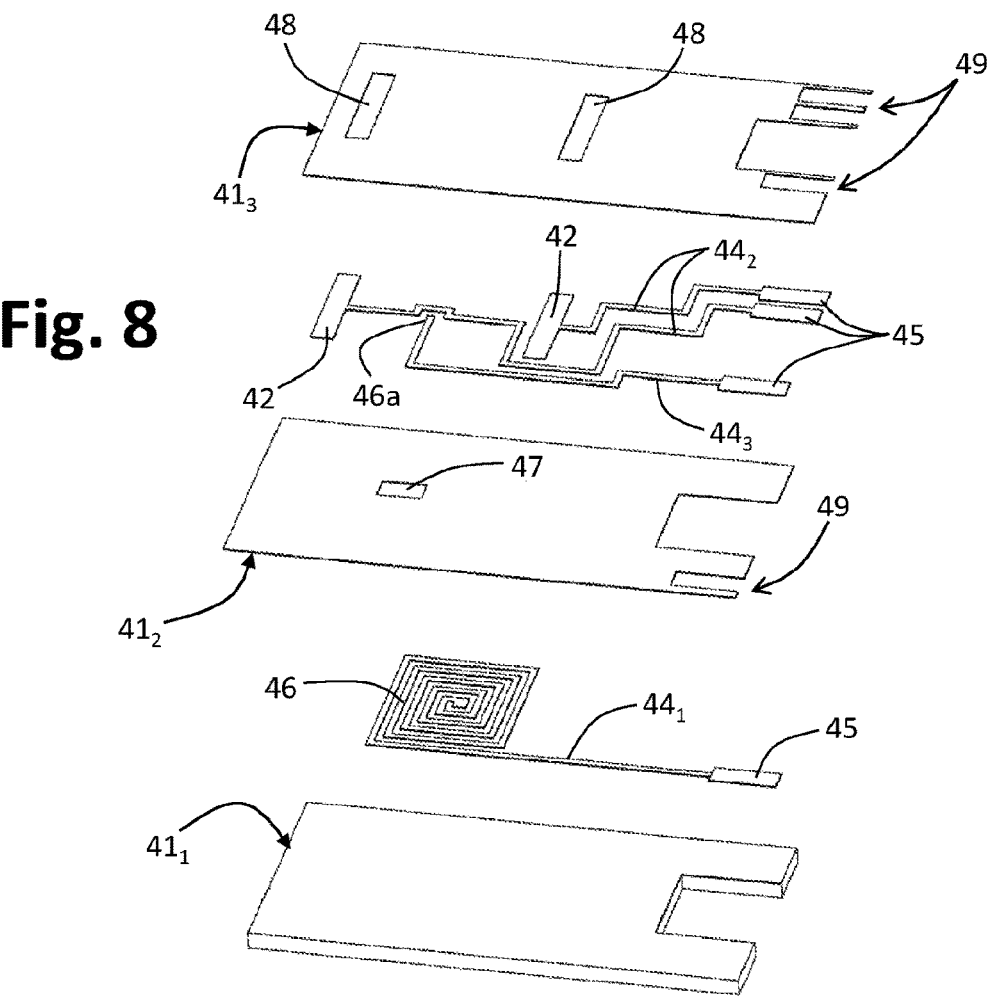

Fig. 13a
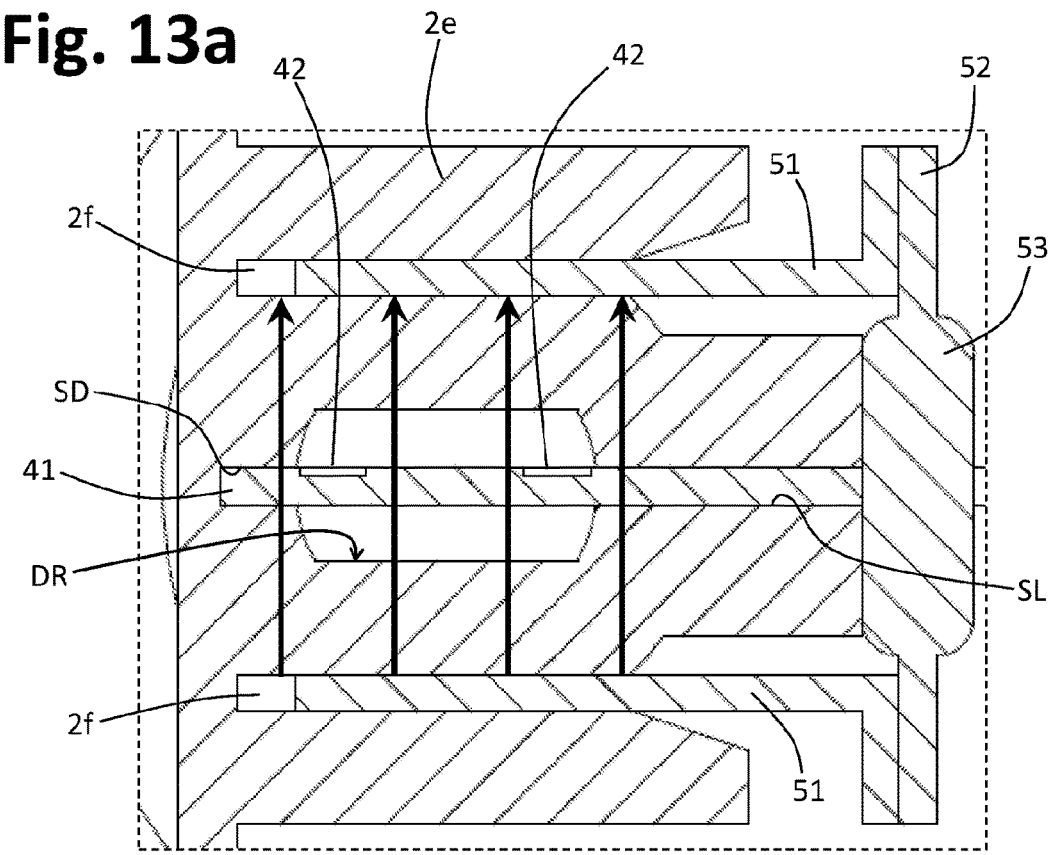
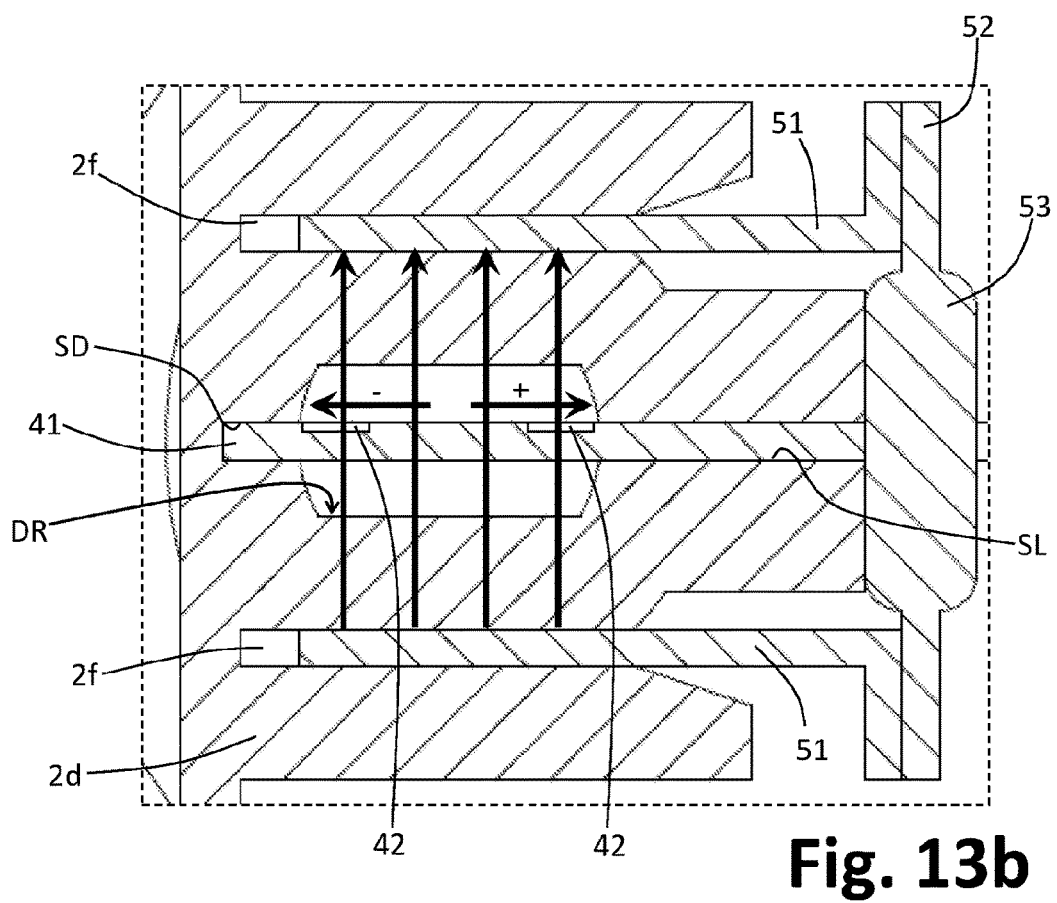
Fig. 13b

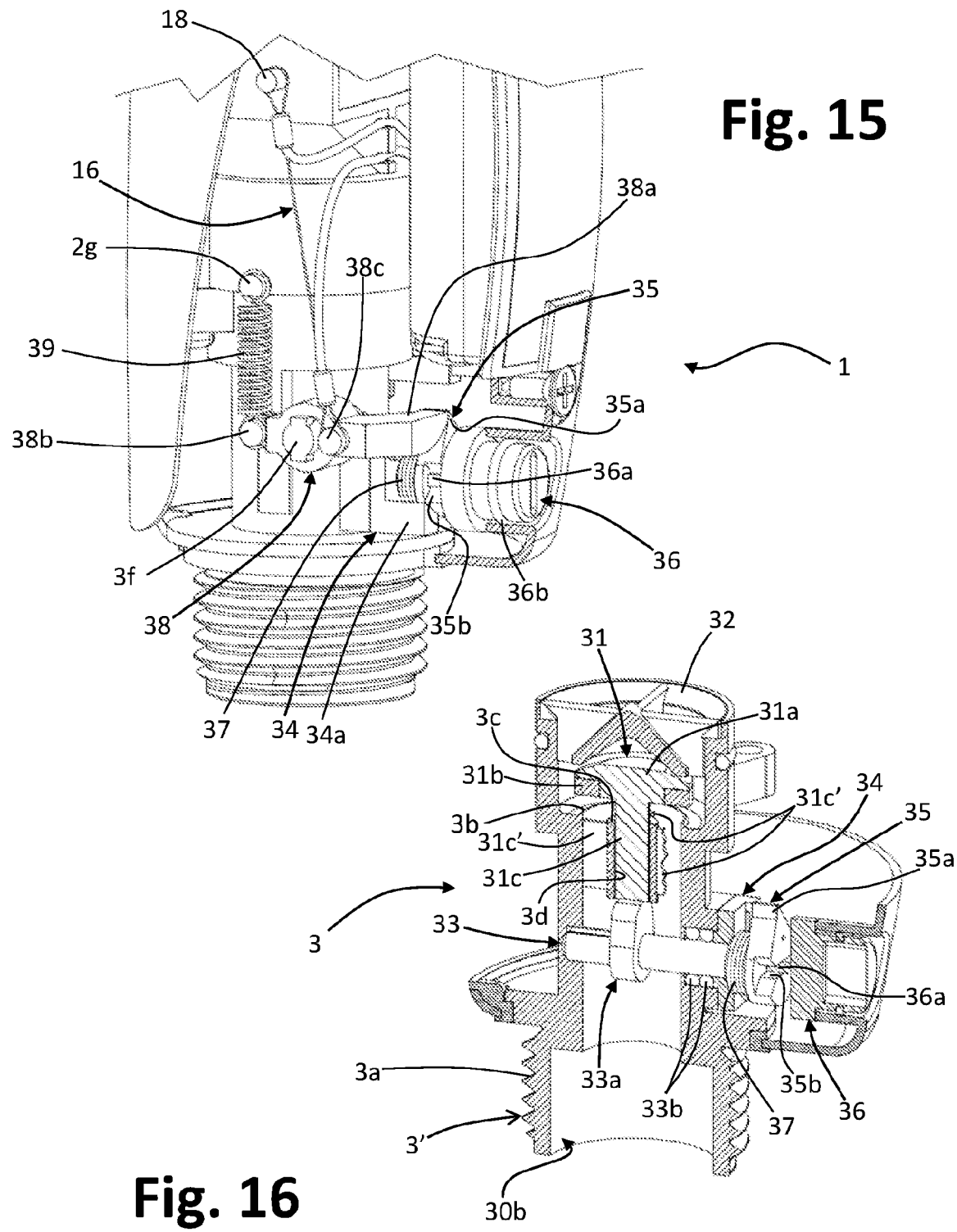

HYDRAULIC CONTROL DEVICE FOR LIQUID-CONDUCTING APPLIANCES AND SYSTEMS

This application is the U.S. national phase of International Application No. PCT/IB2018/057480 filed Sep. 27, 2018 which designated the U.S. and claims priority to IT Patent Application No. 102017000112681 filed Oct. 6, 2017, the entire contents of each of which are hereby incorporated by reference.

FIELD OF THE INVENTION

The present invention relates to hydraulic control devices for liquid-conducting appliances or systems, prearranged for connection between a source for supply of a liquid and an appliance or system that uses the liquid. The invention has been developed with particular reference to a hydraulic control device prearranged for measuring the flow or volume of liquid that flows through the device itself and for interrupting the flow of the liquid when the volume measured reaches or exceeds a pre-set volume, or the flow measured differs from pre-set values or ranges of values.

The device according to the invention finds a preferred application in the sector of water-conducting household appliances, such as laundry-washing machines and dishwashers, where the device itself basically fulfils functions of anti-flooding safety. More in general, the invention may be used in combination with all those hydraulic devices and systems in which it may be useful or necessary to interrupt a flow of a liquid when a pre-set volume is reached or exceeded, for example, in thermo-sanitary systems, heating or air-conditioning systems, irrigation systems, etc.

More in particular, the invention regards a hydraulic control device of the above sort designed for connection between a source of liquid and an appliance or system using the liquid, the hydraulic control device comprising:
- a device body having a duct for the liquid, which extends between an inlet connector and an outlet connector,
- a flow meter on the device body, and
- a valve arrangement on the device body, including a valve member, which is displaceable between a position of opening and a position of closing of the duct for the liquid, and a control mechanism for the valve member,
- wherein the control mechanism is switchable on the basis of a detection made by the flow meter, for the purposes of displacing the valve member from the position of opening to the position of closing of the duct for the liquid.

STATE OF THE ART

Hydraulic control devices for liquid-conducting appliances and systems of the type referred to above are known, for example, from GB2055454 A, on which the preamble of claim 1 is based.

With reference, for example, to the sector of water-conducting household appliances, the devices of the type referred to are typically applied between a point of intake of water from a water mains and the appliance in question, by way of example, upstream of a supply pipe of the appliance.

The device enables measurement of the flow-rate of water that continuously flows from the water mains into the appliance and is prearranged for interrupting the flow in the case where the amount of water at inlet is equal to or higher than a certain safety limit, which can be defined beforehand in the production stage or can be set by the user.

For this purpose, the device typically comprises a flow meter, a valve arrangement, and, frequently, a regulation arrangement aimed at enabling setting of the aforesaid safety limit. In this way, if the safety limit predefined or set for the control device is 50 l, upon detection of a corresponding volume of water, detected via the flow meter, the hydraulic control device interrupts the flow, via its own valve arrangement. The device is in general devised for detecting the aforesaid amount of water corresponding to the safety limit in the presence of a continuous flow, i.e., in the absence of interruptions of the flow itself, since this circumstance is indicative of the fact that the appliance supplied thereby is not functioning properly. Instead, when the appliance functions properly, intake of water occurs at successive intervals, each time reaching single amounts of water introduced that are lower than the safety limit. For this purpose, let us take, for example, a washing machine, the operating cycle of which typically envisages a succession of single treatment steps, each of which presupposes loading into the machine of a given amount of water lower than the safety limit. Obviously, the sum of the individual amounts of water necessary for execution of the various steps can exceed the safety limit, but, as has been said, these amounts are loaded in a non-continuous way (and each step of the operating cycle usually terminates with discharge of the water from the appliance).

To provide a still more specific example, assume that the cycle executed on the appliance requires, for carrying out a treatment step, loading of an amount of water of 30 l. This amount is hence taken in continuously from the water mains, and once the amount (measured inside the appliance, for example, via a pressure switch of its own) has been reached, the appliance interrupts intake of water, for example causing closing of a loading valve thereof. In this circumstance, the hydraulic control device does not cause closing of its own internal valve arrangement, given that the corresponding safety limit is set at 50 l. The hydraulic control device is, however, able to detect, via its internal flow meter, arrest of flow at the end of intake of the amount of 30 l, and consequently to reset the count made by the flow meter until that moment. Consequently, even if subsequently a second loading of water is envisaged (for example, once again an amount of 30 l, for carrying out a subsequent step of the treatment cycle), the flow meter will start a new count of the litres, starting from zero, and the hydraulic control device will not stop the flow via its own valve arrangement (unless, of course, the aforesaid second charging of water continues beyond 50 l, which is a condition indicative of malfunctioning of the appliance).

For reasons of cost, in the majority of the hydraulic control devices of the type referred to above, both the flow meter and the valve arrangement are of a mechanical type and are devised for interacting together, typically via gear transmissions. This may be a source of problems, in view of possible sticking of the flow meter and/or of the valve arrangement. This sticking may be due, for example, to the presence of impurities in the water coming from the water mains, such as sand, soil, or iron residue, which can deposit over time between the blades of the impeller and the body that houses it, and thereby cause sticking of the impeller itself. The aforesaid impurities can also penetrate between gears or other movable members that connect the flow sensor to the valve arrangement, thus preventing activation of the latter when necessary. Known flow meters moreover envisage mechanical parts constantly in motion in the presence of a flow of the liquid, are hence subject to inevitable wear, which can cause imprecision of detection, and are barely suitable for detecting very small flow-rates of liquid (for example, of a few millilitres per minute).

It is evident that, in the case of sticking of the flow meter and/or of the valve arrangement, or else of absence of detection of a flow that is constant and prolonged but at a low rate, the hydraulic control device does not fulfil correctly its own functions, typically not interrupting the flow of the liquid when the safety limit is reached.

OBJECT AND SUMMARY OF THE INVENTION

In its general terms, the present invention has the aim to solve one or more of the aforesaid drawbacks of the prior art. In this context, an aim of the invention is to provide a hydraulic device of the type indicated that is less subject to risks of sticking due to the presence of possible impurities present in the liquid that flows in the device itself, or else to imprecision of operation due to the absence of detection of low flow-rates of the liquid controlled. A further aim of the invention is to provide a hydraulic control device of the type referred to that presents high measuring precision. Yet a further aim of the invention is to provide a hydraulic control device of the type referred to that is able to carry out safety functions additional to just detection of overstepping of a pre-set amount of the liquid controlled.

One or more of the above aims, and yet other aims that will emerge more clearly hereinafter, are achieved according to the present invention by a hydraulic control device for liquid-conducting appliances or systems having the characteristics indicated in the annexed claims. The claims constitute an integral part of the technical teaching provided herein in relation to the invention.

BRIEF DESCRIPTION OF THE DRAWINGS

Further objects, characteristics, and advantages of the invention will emerge clearly from the ensuing detailed description, with reference to the annexed drawings, which are provided purely by way of explanatory and non-limiting example and in which:

FIG. 5 is a partially exploded schematic perspective view of the device of FIG. 2, with a casing part removed;

FIG. 7 is an exploded schematic perspective view of a flow-meter unit of a hydraulic control device according to possible embodiments of the invention;

FIG. 8 is a schematic exploded view of a support belonging to a flow meter of a hydraulic control device according to possible embodiments of the invention;

FIGS. 13a and 13b are details of FIG. 13, aimed at illustrating schematically the operating principle of a flow meter that can be used in a hydraulic control device according to possible embodiments of the invention;

FIG. 15 is a partially sectioned schematic perspective view of a portion of a hydraulic control device according to possible embodiments of the invention, in a first condition;

FIG. 16 is a sectioned perspective view of a second functional unit of a hydraulic control device according to possible embodiments of the invention, in a first condition;

DETAILED DESCRIPTION OF PREFERRED EMBODIMENTS OF THE INVENTION

Reference to "an embodiment", "one embodiment", "various embodiments", and the like in the course of this description is meant to indicate that at least one particular configuration, structure, or characteristic described in relation to an embodiment is comprised in at least one embodiment. Hence, phrases such as "in an embodiment", "in one embodiment", "in various embodiments", and the like that may be present in various points of this description do not necessarily refer to one and the same embodiment, but may, instead, refer to different embodiments. Moreover, particular conformations, structures, or characteristics defined in the course of this description may be combined in any adequate way in one or more embodiments, even different from the ones represented. The reference numbers and spatial references (such as "upper", "lower", "top", "bottom", "front", "back", "vertical", etc.) used herein, in particular with reference to the examples in the figures, are only provided for convenience and hence do not define the sphere of protection or the scope of the embodiments. In the present description and in the attached claims, the generic term "liquid" is to be understood as comprising water or other liquids, including mixtures and solutions containing water and/or other liquids. Likewise, the generic definition "liquid-conducting appliances and systems" must be understood as comprising all those devices, appliances, apparatuses, and systems that are supplied or that, more in general, use at least one liquid (such as household apparatuses or systems, thermo-sanitary systems, heating or air-conditioning systems, irrigation systems, etc.).

In the figures, the same reference numbers are used to designate elements that are similar or technically equivalent to one another.

Figure 1:
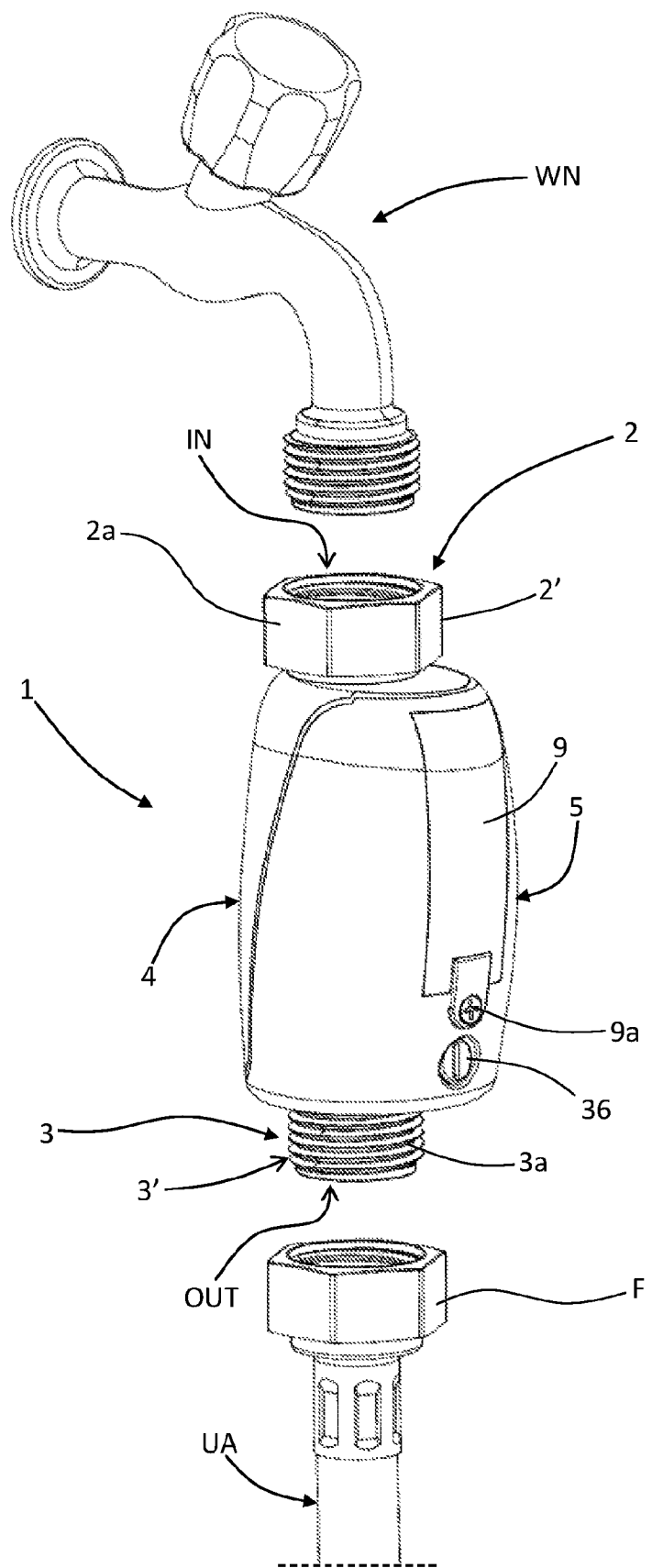
FIG. 1 is a schematic perspective view of a hydraulic control device according to possible embodiments of the invention, designed for being installed between a generic source of a liquid and an appliance or system that uses the liquid.

With reference to FIG. 1, designated as a whole by 1 is a hydraulic control device according to possible embodiments of the invention, designed to be connected between a generic source or point of intake of a liquid, designated by WN, and a generic liquid-conducting appliance or system or plant, designated by UA. In the ensuing example, it is assumed that the intake point WN is a tap belonging to a domestic water mains and that the appliance UA is a household machine for washing (such as a laundry-washing machine or a dishwasher), represented limitedly to a pipe thereof for loading of the water. As explained in the introductory part of the present description, the device 1 may be used in other contexts, different from the domestic one.

In general terms, defined within the device 1 is a duct for the liquid, having an inlet IN and an outlet OUT. Operative along this duct are a flow meter and a valve arrangement, which is prearranged for closing the aforesaid duct on the basis of the measurements made via the flow meter, as explained in the introductory part, i.e., when—in the presence of a continuous flow—it is detected that an amount of liquid has been reached equal to or higher than a given limit, here conventionally referred to as "safety limit", which can be defined beforehand in the production stage or can be set by the user. Advantageously, as will be seen, in various embodiments of the invention, the device 1 is moreover prearranged for closing the aforesaid duct when a flow of liquid outside a normal or pre-set range of values (hence a flow that is too low or too high) is detected.

Figure 2:
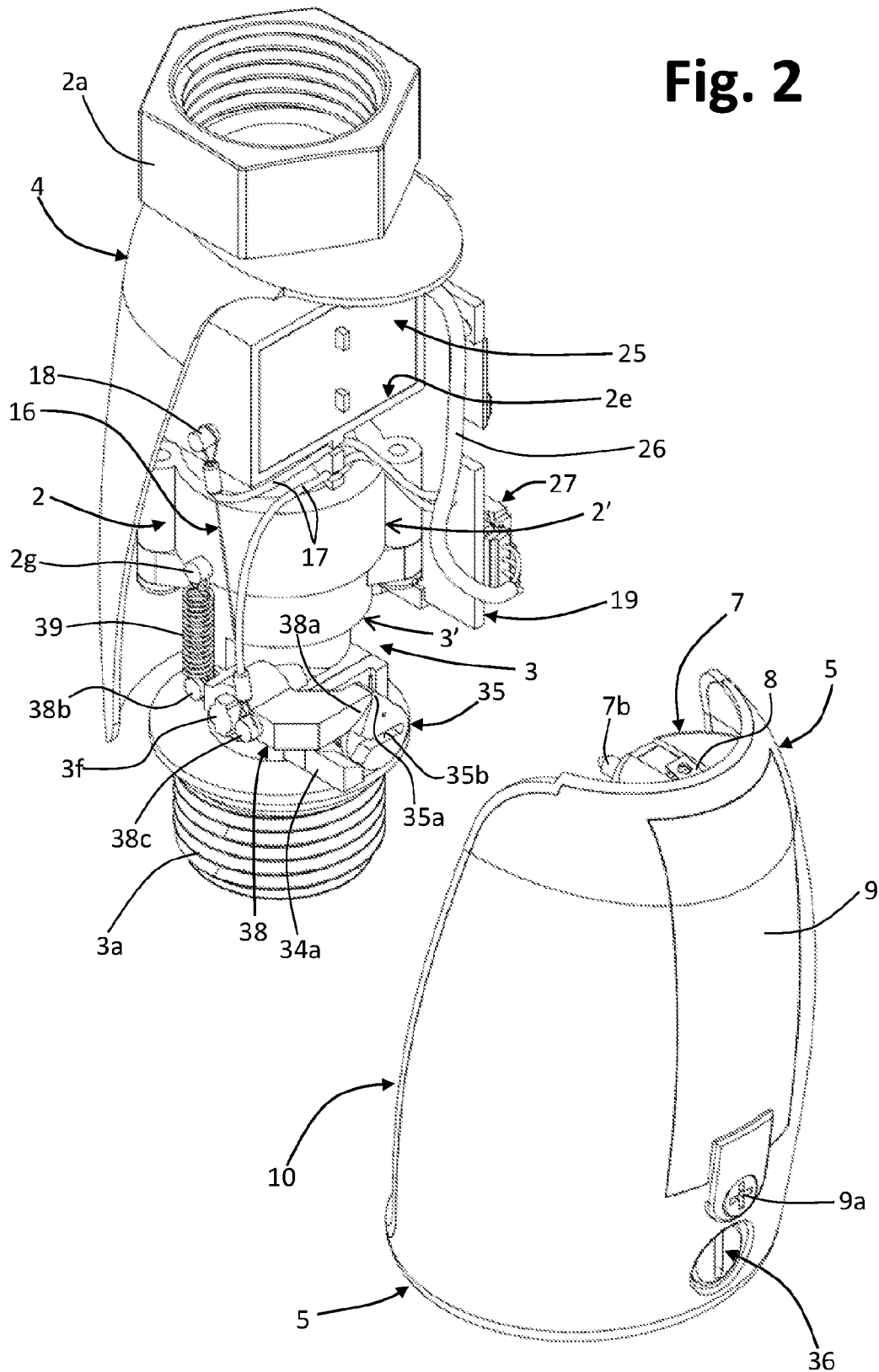
FIG. 2 is a partially exploded schematic perspective view of a hydraulic control device according to possible embodiments of the invention.

The device has a connector body defining the inlet IN and the outlet OUT, which is preferably made—at least in a part provided with the flow meter—of an electrically insulating material, preferably a plastic material. With reference also to FIGS. 2 and 5, in various embodiments, the device 1 comprises two functional units 2 and 3, each of which is preferably provided with a body of its own, 2' and 3', respectively, which defines a respective part of the duct for the liquid. Preferably, the two functional units 2 and 3 integrate the flow meter and the valve arrangement, respectively. For this reason, in what follows, the units 2 and 3 will be also referred to as "meter unit" and "valve unit", respectively. The bodies 2' and 3' of the two units 2 and 3 are mechanically connected together in a fluid-tight way. Not excluded from the scope of the invention is the case of integration of the flow meter and of the valve arrangement in one and the same functional unit, or provision of the connector body of the device in a single piece. In various embodiments, such as the ones exemplified in the figures, the flow meter, or the corresponding unit 2, is located upstream of the valve arrangement, or of the corresponding unit 3, along the duct for the liquid, but this does not constitute an essential characteristic, an opposite arrangement being in fact possible.

With reference also to FIGS. 2 and 5, the bodies 2' and 3' define an inlet connector or fitting 2a and an outlet connector or fitting 3a, respectively, at terminal portions of the duct for the liquid. In the non-limiting example, the fitting 2a comprises a body portion provided on the inside with a female thread and externally shaped—for example, with hexagonal profile—so as to facilitate screwing to a corresponding male thread (not represented), in particular of the tap WN. On the other side, the fitting 3a comprises a body portion provided on the outside with a male thread, on which there can be screwed a corresponding female thread, for example defined in a ring nut F of the water-inlet pipe of the appliance UA.

In various embodiments, the fitting 2a is a normalized or standard fitting of a type complementary to the fitting of the source of liquid. In this perspective, for example, the aforesaid female thread of the fitting 2a may be complementary to a male thread, such as that of the fitting 3a, typical for connection of electrical household appliances (usually a ¾" gas fitting). Hence, more in general, the fitting 2a will be a fitting of a normalized or standard type for the sector of use envisaged for the device 1. The device 1 may obviously provide connector arrangements different from the ones exemplified, according to a known technique, for example, using rotary ring nuts and/or bayonet-coupling fittings.

The device 1 may be provided with an outer casing. In various embodiments, a casing is provided made up of at least two parts, such as those designated by 4 and 5, which basically provide two shells that can be coupled together so as to enclose inside them the two functional units 2, 3 joined together, preferably except for the respective fittings 2a and 3a, which project, for example, in opposite directions and/or in one and the same axial direction. In various embodiments, the shell 4 is made of a single piece with the body 2', but the shell 4 could also be configured as distinct part fixed on the body 2'. The shell 5 is preferably configured as stand-alone component, which can be coupled to the shell 4 and fixed in position with respect to at least one of the bodies 2' and 3', for example, as explained hereinafter.

In the control device according to the invention, at least one of the flow meter and the valve arrangement, preferably both, is/are of a type that can be electrically supplied. For this purpose, in various embodiments, the device is provided with an autonomous electrical-supply source of its own, which preferably comprises at least one battery, such as the one designated by 6 in FIGS. 3 and 6, preferably of a replaceable type. On the other hand, in other embodiments not represented, the electrical and electronic parts of the device 1 could be supplied from the power mains, by means of a wired connection.

In various embodiments, the casing of the control device is configured for enabling easy access to the autonomous electrical-supply source, envisaging for this purpose at least a part thereof that is removable. In preferred embodiments, for example as may be seen in FIGS. 3 and 4, the body of the shell 5 defines a seat 7 for housing the battery 6, in particular a seat in a position set in with respect to the front profile of the shell 5.

Associated to the seat 7 are electrical contacts 8 for connection to the positive and negative terminals of the battery itself. Preferably, the seat 7 is recloseable at the front by means of a hatch 9, which, in its closed condition, may be substantially flush with the outer profile of the shell 5. The hatch 9 is preferably of a removable type and can be kept in its closed condition through an engagement system of a type in itself known and/or with a screw 9a, for example, for engagement in a corresponding seat 5a on the front of the shell 5.

In various embodiments, the control electronics of the device according to the invention is prearranged for measuring and/or signalling the state of charge of the autonomous electrical-supply source. The device may for this purpose be provided with a warning light or a buzzer, for example suited to indicating when the level of charge of the battery 6 drops below a given threshold. The control electronics may possibly be prearranged for communicating information on the state of charge to an external electronic device (such as a dedicated remote control, a smart phone, a tablet, a personal computer, etc.), for example, via a wireless connection and/or the Internet (in which case, the device will be provided with a gateway for connection to the Internet). In various preferred embodiments, the control electronics of the device 1 is prearranged in such a way as to cause closing of the valve arrangement when the level of charge of the battery 6 drops below the aforesaid given threshold, for reasons of safety.

The shell 5 is preferably fixed in position with respect to the body of at least one of the two units 2 and 3. For this purpose, in the case exemplified in FIGS. 3 and 4, defined on the bottom of the seat 7 is at least one passage 7a for a corresponding fixing screw 7b, designed to engage in a corresponding seat (2b, FIG. 5) defined in the body 2'.

As may be seen in FIG. 4, in various embodiments, the shell 5 has a lower wall provided with a passage 5b so that it can be fitted through the outlet fitting 3a defined by the body 3', as well as a through seat 5c at its front, preferably a substantially tubular or cylindrical seat, for a reset member 36 described below. As will emerge clearly hereinafter, in fact, in preferred embodiments, the valve arrangement of the device according to the invention is prearranged for being reset by acting on a member directly accessible from the outside of the casing, in a simple and fast way, preferably without any need to disconnect the device hydraulically from the point of intake of the liquid and from the appliance or system supplied thereby.

The shell 5 is preferably made of moulded plastic material, and preferably associated thereto are one or more sealing elements, made, in particular, of elastomeric material. As may be seen in FIG. 4, in various embodiments, at least one first sealing element is provided, designated by 10a, at the edge of the shell 5 designed to couple with a corresponding edge of the shell 4. Preferably, a sealing element 10b is provided between the hatch 9 and the shell 5, at the seat 7 for the battery 6. A sealing element, such as the one designated by 10c, may be provided at the lower part of the shell 5, for ensuring fluid tightness between the shell 5 and the body 3'. In the case exemplified, the sealing element 10c is located substantially at the lower wall of the shell 5, where the passage 5b is defined through which the outlet fitting 3a can extend.

Figure 4:
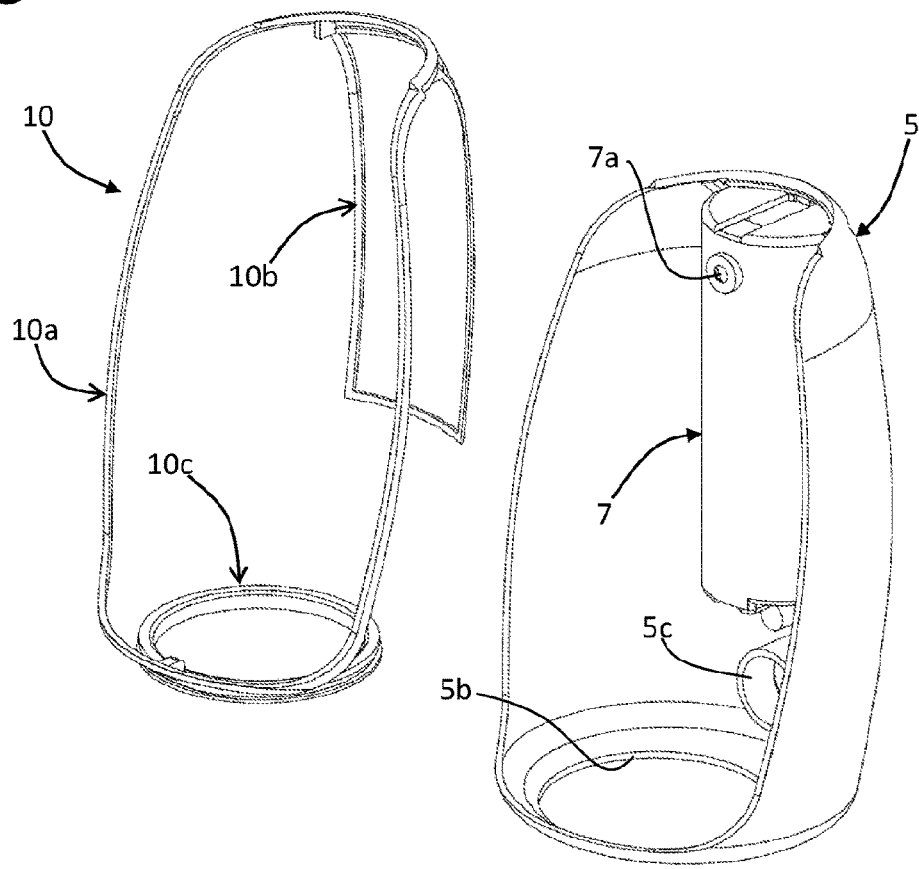
FIG. 4 is a schematic perspective view of a casing part of a hydraulic control device according to possible embodiments of the invention and of a corresponding gasket.

In various embodiments, two or more of the sealing elements 10a, 10, and 10c are made of a single piece 10, as may be seen, for example, in FIG. 4. The aforesaid single piece 10 may be directly overmoulded on the shell 5, for example, via a process of injection of thermoplastic rubber or an elastomeric. In this way, it is possible to obtain a single gasket 10 that protects from infiltration of water and external humidity both the junction between the shells 4, 5 and the junction between the hatch 9 and the shell 5, as well as the junction between the shell 5 and the body 3'. Alternatively, one or more of the sealing elements 10a, 10b, and 10c may be configured as distinct parts.

Figure 6:
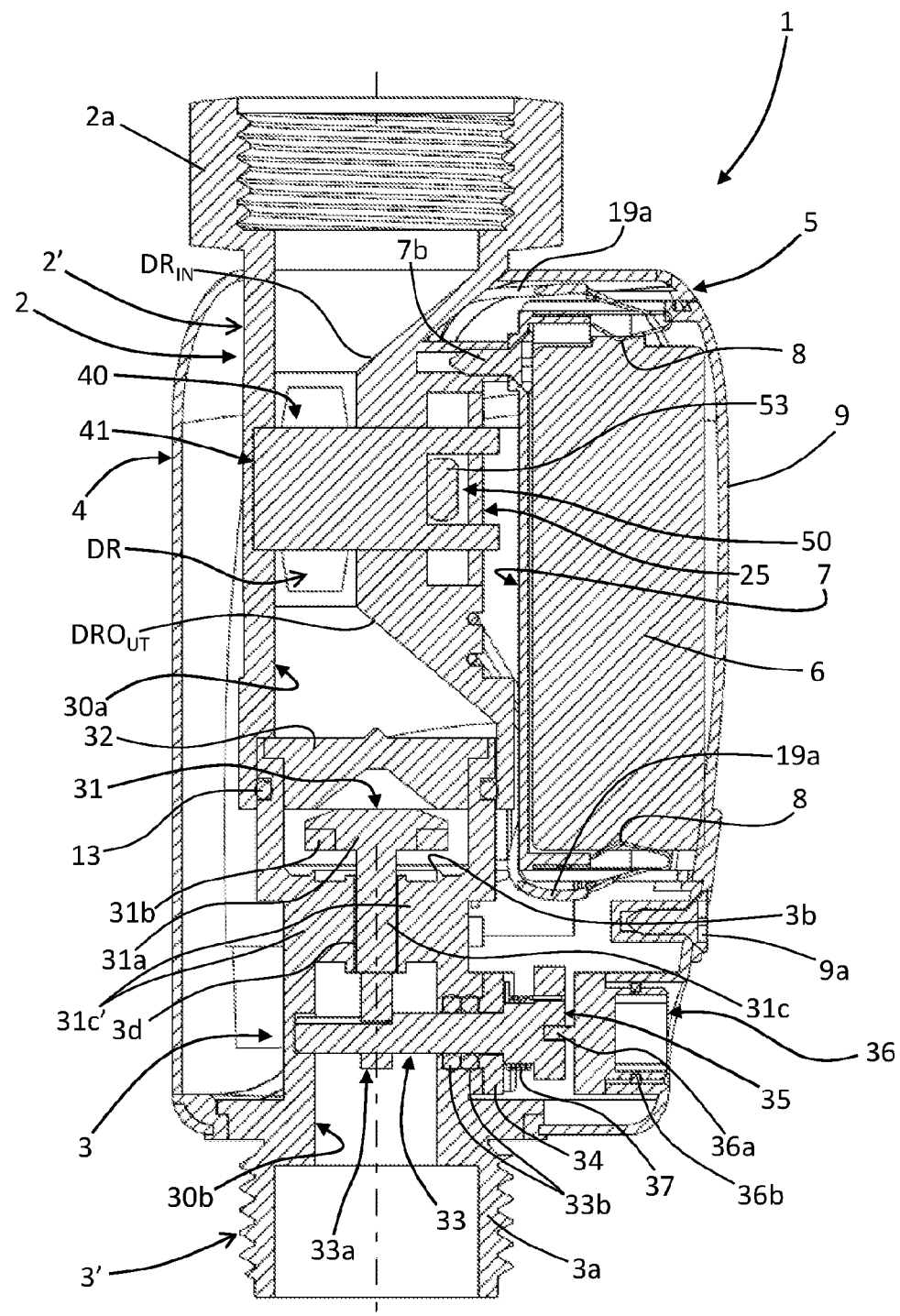
FIG. 6 is a schematic vertical-sectional view of a hydraulic control device according to possible embodiments of the invention.

The meter unit 2 and the valve unit 3 are visible in FIG. 2 in the assembled condition, i.e., with the respective bodies 2' and 3' coupled together, whereas in FIG. 5 they are visible in a separate condition. Visible in the cross-sectional view of FIG. 6 is the duct for the liquid that extends between the fittings 2a and 3a, which—in the case exemplified—is formed by duct parts 30a and 30b, defined in the body 2' and in the body 3', respectively.

Figure 11:
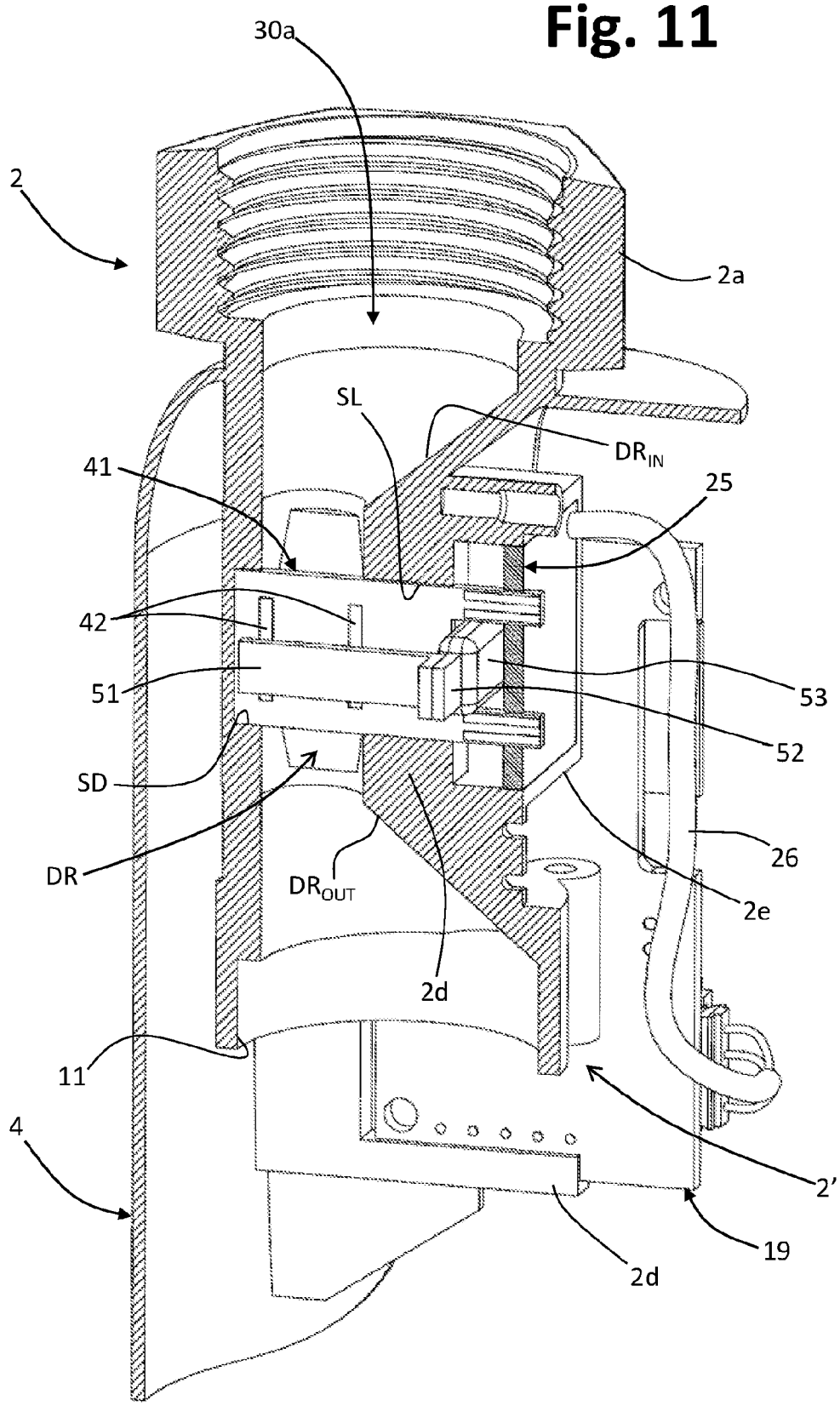
FIG. 11 is a partially sectioned schematic perspective view of a first functional unit of a hydraulic control device according to possible embodiments of the invention.

With reference in particular to FIG. 5, the body 2' has a hydraulic coupling portion 11, generally opposite to the fitting 2a, defining a seat preferably designed to receive inside it a respective hydraulic coupling portion 12 of the body 3' (see also FIG. 11). In the coupling region, as visible also in FIG. 6, a gasket, designated by 13, is preferably provided. The bodies 2' and 3 may be mechanically secured together in various ways. In the case exemplified, the bodies 2' and 3' define, at or in the proximity of the coupling portions 11 and 12, respective brackets 14' and 14" for mutual fixing via screws 15 (FIG. 5).

In various embodiments, the valve arrangement that equips the hydraulic control device according to the invention may be driven via an electrically supplied actuator, at least for the purposes of its passage from the position of opening to the position of closing of the duct for the liquid. According to an aspect in itself autonomously inventive, in various preferred embodiments, the electric actuator comprises a thermoelectric actuator element, in particular a shape-memory actuator element.

As is known, shape-memory actuator elements use metal alloys that are able to undergo deformation following upon overstepping of a pre-set transition temperature, where heating may be obtained by supplying an electric current through the actuator element so as to heat it by the Joule effect. These actuator elements made of shape-memory alloy are produced so as to maintain, in conditions of low temperature, i.e., when they are not heated, a configuration of a martensitic type, with low yield point, in which the element is easily deformable. Following upon heating, the alloy re-arranges in another crystalline structure, of an austenitic type, to assume a configuration pre-determined in the production stage. The transition temperature, starting from which the alloy "remembers" its primitive or pre-set shape, can be modified by varying the composition or with appropriate thermal treatments in the production stage.

In preferred embodiments of the invention, an actuator element is used that comprises a flexible wire, such as the one designated by 16 in FIGS. 2 and 5, made at least in part of a shape-memory material. The material in question is preferably selected from among Ni—Ti, Ni—Ti—Cu, Cu—Al—Zn, and Cu—Al—Ni shape-memory alloys, which are able to recover considerably the deformation or generate a considerable force during phase transition. The use of a shape-memory-wire actuator is extremely advantageous, in view of its simple structure, limited overall dimensions, low cost, and low electrical consumption.

The wire 16 may possibly be provided with an external sheath, or there may be moulded thereon an elastic coating layer, which adheres to the wire itself and is chosen of an elastomeric material or a silicone material or a synthetic material. This coating may be operative for favouring cooling of the wire 16 after the passage of electric current in the latter ceases, and possibly for contributing to enabling return of the wire 16 into a resting configuration as a result of the elastic return of the coating (on the other hand, as will be seen, in various embodiments, this return can be determined by elastic means, advantageously included in the valve arrangement of the device).

The wire 16 is prearranged for being anchored at its respective ends, in particular between the body 2'-3' of the device 1 and a moving element (described hereinafter) of the corresponding valve arrangement. In various embodiments, for example, the wire 16 may be bent back on itself at its opposite end regions to define loops used for anchorage of the wire itself. These loops (which are not designated by any reference number) may be clearly seen, for example, in FIGS. 2 and 5. For the purposes of definition of the looped ends, on the wire 16 there may be fixed bushing elements or the like, such as those designated by 16a only in FIG. 5, which may advantageously be exploited also for connection to respective electrical supply conductors 17. In the case exemplified, one looped end of the wire actuator 16 is anchored to a pin or similar engagement element, designated by 18, defined by the body of the device or associated thereto, in particular the body part 2', whereas the other looped end is anchored to a pin or similar engagement element (38c) defined by, or associated to, a moving element (38) of the valve arrangement, as explained hereinafter.

Control of electrical supply to the wire actuator 16 is managed by a circuit arrangement, which preferably includes a circuit support or PCB, designated by 19 in FIGS. 2 and 5, connected to which are the conductors 17. Preferably, the PCB 19 is carried by the body 2' of the meter unit 2, which may define for this purpose one or more brackets 2c (FIG. 5) for positioning of the PCB itself.

In various preferred embodiments, an electric current is supplied through the actuator element 16 so as to heat it by the Joule effect in order to control a corresponding contraction or shortening thereof. Alternatively, the actuator may comprise or be in contact with an electrical heater element (not shown), such as a positive-temperature-coefficient (PTC) resistor, which heats up when it is electrically supplied, and consequently heats the actuator element 16 located in contact with, or in the proximity of, the heater element. For this purpose, the aforesaid leads 17 may be used for electrical supply of the aforesaid heater, instead of directly supplying the wire actuator 16.

According to an aspect in itself autonomously inventive, the flow meter of the hydraulic control device according to the invention is a non-mechanical flow meter, i.e., one that does not envisage moving parts, such as an axial or tangential impeller typically provided according to the prior art. The non-mechanical flow meter includes one or more electrical detection elements, for example in the form of electrodes or tracks or layers of electrically conductive material (for example, made of metal or of pastes or inks with a base of at least one electrically conductive material, such as graphite or carbon-based materials or metal powders), with the aforesaid electrical detection elements that are at least in part in contact with the liquid and/or within the duct for the liquid of the device 1, such as the duct part 30a defined by the body 2' of the meter unit 2.

In various embodiments, the non-mechanical flow meter includes at least one support, preferably substantially planar and/or relatively rigid and straight, for at least one electrical detection element. In various preferential embodiments, the at least one support faces or is at least partially inserted in the duct for the liquid of the device, in such a way that the at least one electrical detection element can be reached by the liquid that flows in the corresponding duct. The aforesaid support could in any case be of a different type, such as a flexible and/or shaped support, for example designed to adapt to, or having a shape substantially complementary to that of, at least part of a wall of the duct for the liquid. The mentioned support could extend in a substantially central position of the duct, or else in a staggered or lateral position of the duct, or at least in part at a wall of the duct, with the liquid that laps the at least one electrical detection element on at least one side or face of the support.

In various preferential embodiments, the at least one support is at least partially inserted through the aforesaid duct for the liquid, or in any case is set in contact with the liquid in such a way that the at least one electrical detection element can be lapped by the water that flows in the corresponding duct, preferably in an area close to the wall of the duct.

In various embodiments, the non-mechanical flow meter is an electromagnetic-induction flow or flow-rate meter. The operating principle of electromagnetic-induction flow sensors, based upon Faraday's law, is in itself known and consequently will not be discussed in detail. Here it is sufficient to recall that, for the purposes of operation of such a sensor, the flow of a fluid that flows in an electrically insulated duct of a given diameter is made to pass through a magnetic flux of a given intensity, which flux is in a direction substantially perpendicular to the direction of the fluid. If the fluid is electrically conductive, which is typically the case of mains water, in this way a potential difference is induced that can be detected by means of two electrodes in contact with the fluid, aligned substantially perpendicular to the direction of the flow of the fluid and of the magnetic field. The potential difference that can be measured via the electrodes is proportional to the mean velocity of the liquid in the duct.

In various embodiments, the flow meter hence comprises an electromagnetic arrangement, prearranged for generating an electromagnetic field in a direction transverse to the flow of the liquid in the aforesaid duct (such as the duct 30a-30b), and a detection arrangement, which comprises at least two electrodes for detecting a potential difference induced by the flow of the liquid through the electromagnetic field, the two electrodes being in contact with the liquid the flow-rate of which is to be measured. Preferably, the at least two electrodes for detection of the potential difference are carried by one and the same support, for example, a planar support. Preferentially, the support is inserted in a transverse direction into the duct for passage of the water. In the case of use of a substantially planar support, the two major faces of the support are substantially parallel to the direction of flow of the liquid. On the other hand, not excluded from the scope of the invention is the case of use of two supports, for example two planar supports, each of which carries at least one respective detection electrode, which are both designed to be inserted in a transverse direction into the duct and/or in a position corresponding to opposite walls of the duct, in generally parallel positions.

As will be seen, in possible alternative implementations, the non-mechanical flow meter is a hot-wire or hot-film meter. Also a flow meter of this type may comprise at least one corresponding support set substantially at the centre of the duct for the liquid, or else in a staggered or lateral position of the duct, or may itself define at least in part a wall of the duct, with the liquid that laps at least one electrical detection element on at least one side or face of the support.

In various embodiments, in the case of use of an electromagnetic-induction flow meter, there may be provided also an arrangement or a sensor for measuring the intensity of the magnetic field generated by the electromagnetic (or permanent-magnet) arrangement, preferably in a position substantially corresponding to, or in the proximity of, the electrodes for measurement of the potential difference. This measurement arrangement may comprises a coil or a winding on the support (for example, in the form of spiral tracks etched or deposited on the support, or possibly in the form of a coil obtained with wire and mounted on the support), in such a way that, in the assembled condition of the device, also the coil or winding will come to be immersed in the magnetic field generated by the electromagnetic arrangement. Alternatively, the aforesaid arrangement or sensor for measuring the magnetic field could be of a Hall-effect type, for example, comprising an electronic chip mounted on a support, such as the support of the electrodes of the flow meter. Such a Hall-effect sensor could advantageously be coated with a protective layer (such as a layer of the type designated hereinafter by $41_2$) and/or with a resin so that it can be located within the duct 30, or else could be mounted outside the duct 30, for example in a seat provided in the body 16.

The aforesaid measurement arrangement (or sensor) may be used, for instance, for detecting possible unforeseeable variations of the magnetic field, for example, caused by temperature.

In various embodiments, on the support referred to above there may be provided at least one further reference electrode, of potential ground of the water.

Schematically represented in FIG. 7 are two parts of an electromagnetic-induction flow sensor that can be used in various embodiments of the invention, i.e., a detection arrangement 40 and an electromagnetic arrangement 50.

In the example, the detection arrangement 40 comprises a support 41, preferably planar and relatively rigid and straight, which may, for example, be made of plastic material, or ceramic material, or composite material (for example, FR4), or combinations of a number different materials. Present on the support 41 are signal electrodes 42, conductive tracks—some of which are designated by 44 in FIG. 8—and connection pads 45. The electrodes, the tracks, and the pads, which are also substantially planar, may, for example, be deposited, preferably using silk-screen or deposition techniques, or be obtained with etching techniques. As will be clarified hereinafter, the electrodes 42 are used for measuring the potential difference representing a value of flow-rate of the water in the duct 30$a$-30$b$.

In various embodiments, the support 41 may also be provided with the aforementioned arrangement or sensor for measuring the magnetic field induced by the electromagnetic arrangement 50. With reference to the case exemplified in FIG. 7, a measurement coil is provided for this purpose, not visible in so far as it is defined within the support 41, here having a multilayer structure, which is in a position substantially corresponding to the electrodes 42. The aforesaid measurement coil (or a Hall-effect sensor that replaces it) may advantageously be used for providing a direct feedback of the intensity of the magnetic field generated by the arrangement 50 in the area of the electrodes 42, and thereby have available a signal useful for evaluating the presence of possible variations or problems of the electromagnetic system, such as variations due to tolerances of production and/or ageing and/or variations in temperature or faults following upon damage to the device.

In various embodiments, the electromagnetic arrangement 50 has a generally U-shaped configuration, or a configuration distinguished by the presence of two poles or yokes arranged substantially parallel or set alongside one another, between which the magnetic field previously mentioned is generated. In the case exemplified in FIG. 7, the arrangement 50 comprises two yokes or poles 51 made of ferromagnetic material, which are generally parallel and are connected together by means of a third yoke 52, made of ferromagnetic material, arranged or wound on which is an electrical coil 53, with corresponding supply conductors 54. The yoke 52 may advantageously be made of materials with high magnetic remanence (semi-hard materials). As will be seen, this enables a saving of electrical energy that is very useful for reducing consumption of the battery 6.

With reference also to FIG. 8, the support 41 may present a plurality of layers stacked on top of one another. In various embodiments, a base layer $41_1$ is provided made of an electrically insulating material, such as a plastic material (for example, polycarbonate), or else a ceramic material, or else a composite material (for example, FR4).

In various embodiments, on the base layer $41_1$ there may be defined at least one first conductive track $44_1$, which forms the aforementioned coil for measurement of the magnetic field, designated by 46, in particular a first conductive track $44_1$ wound in a spiral. The base layer $41_1$ is coated with an intermediate layer $41_2$, made of electrically insulating material, which protects and insulates the first track $44_1$ and is provided with a through opening 47 at the distal end of the track $44_1$ itself, which is substantially at the centre of the coil 46.

On the layer $41_2$ a second pattern with a number of conductive tracks, designated by $44_2$, is defined. The tracks $44_2$ define at the respective distal ends the electrodes 42, which are located in a substantially central region of the layer $41_2$. In the presence of the coil 46, a further track $44_3$ may be provided, the distal end of which defines a contact 46$a$ at the opening 47 of the intermediate insulating layer $41_2$, for electrical connection with the centre of the underlying coil 46 (i.e., the distal end of the corresponding track $44_1$). In this way, at the pads 45 of the tracks $44_1$ and $44_3$ a potential difference can be detected that is proportional to the intensity of the magnetic field generated by the electromagnetic arrangement 50.

The intermediate layer $41_2$ is coated with a further layer of electrically insulating material $41_3$, which protects and insulates all the underlying conductive tracks, leaving exposed only the electrodes 42 that are to be immersed in the liquid in order to measure the electrical potential proportional to the flow-rate. In the example shown, the layer $41_3$ is provided with openings 48 so that the electrodes 42 can be left exposed.

The various conductive tracks define, at their respective proximal ends, the connection pads 45, which are located at one edge of the layers $41_1$ and $41_2$, respectively. In order to leave the pads 45 exposed, the layers $41_2$ and $41_3$ define respective passages 49. In the example, the tracks $44_2$ that define the electrodes 42 are present on just one major side of the base layer $41_1$. It is on the other hand possible to provide similar tracks—and hence similar electrodes 42 and a layer $41_3$—also on the opposite major side of the base layer $41_1$ in order to double the sensitive surface of the electrodes for measuring the potential difference representing the value of flow-rate of the liquid.

The conductive tracks provided on the planar support 41 may be defined via silk-screen printing technique or some other deposition technique, using, for example, inks with a base of coal or graphite or metals.

In the presence of the aforementioned reference electrode of potential ground of the water, on the base layer $41_2$ there may be provided a corresponding conductive track, similar to the tracks $44_2$, defining the reference electrode and the corresponding connection pad. The layer $41_3$ will envisage a corresponding opening 48 and a corresponding passage 49 for leaving the reference electrode and the corresponding pad exposed.

In various preferred embodiments, the duct for the liquid defined in the body of the device according to the invention, i.e., in its bodies 2' and 3', has a detection region, where the flow meter is installed.

Figure 9:
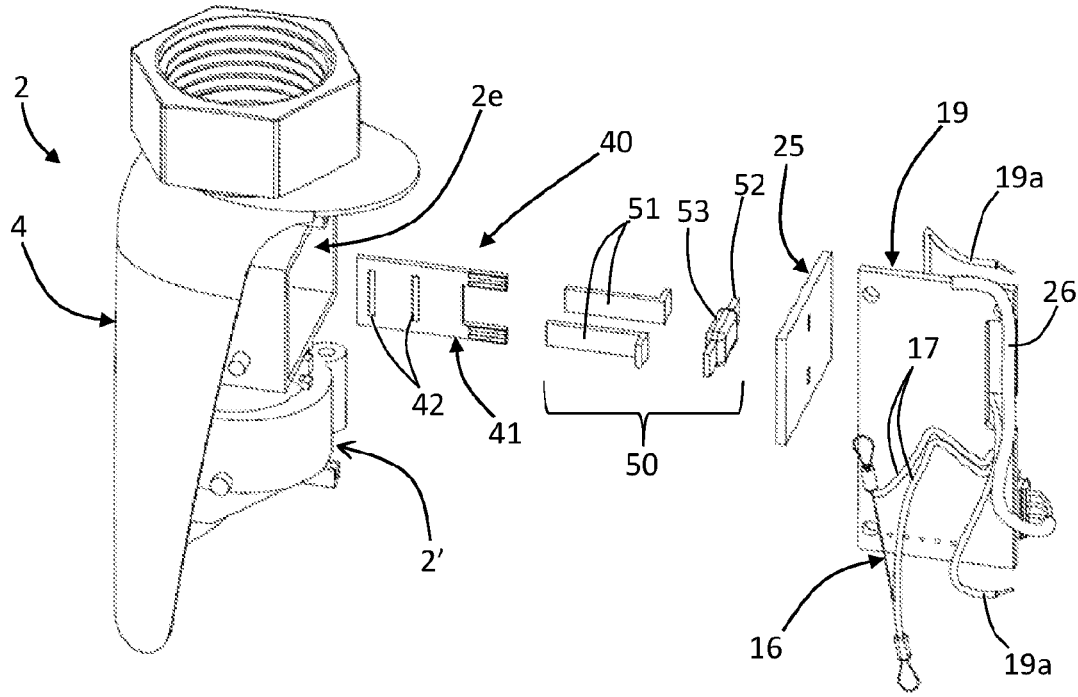
FIGS. 9 and 10 are partially exploded schematic perspective views from different angles of a first functional unit of a hydraulic control device according to possible embodiments of the invention.
Figure 10:
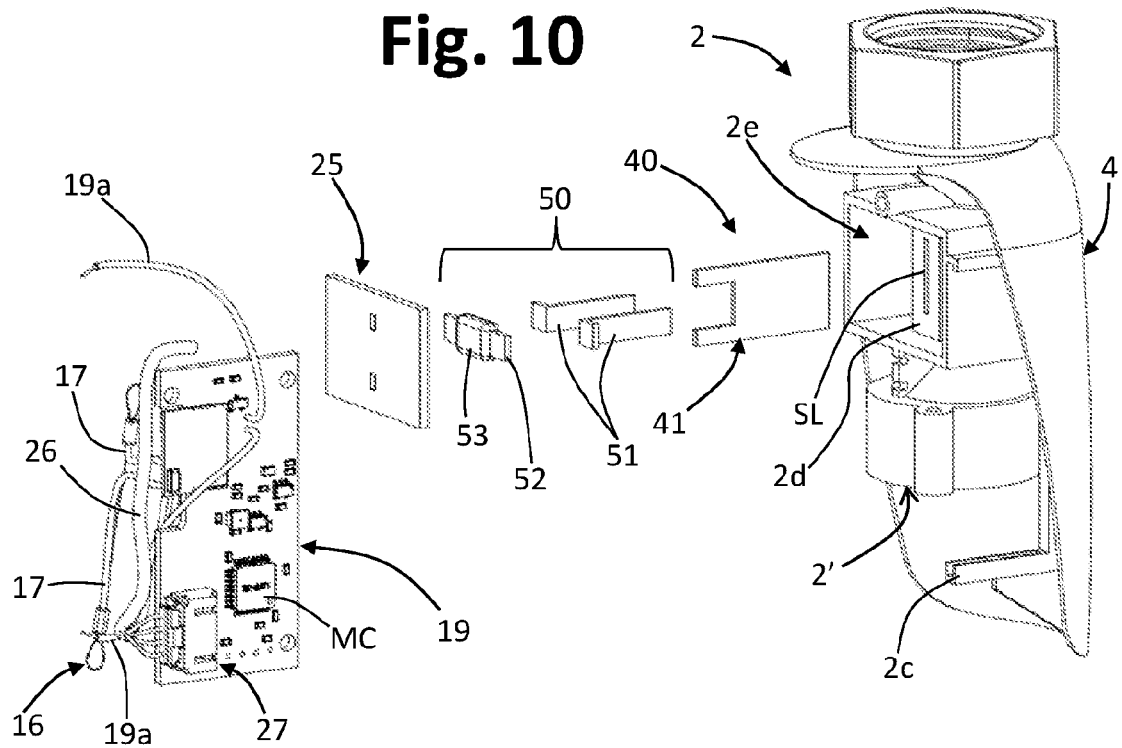

With reference to FIGS. 9-11, in various embodiments, the body on which the flow meter is installed—here the body 2'—has, at an intermediate portion thereof that defines at least part of the duct for the liquid—here the part 30$a$—at least one through opening, designated by SL in FIGS. 10-11, for example in the form of a substantially rectangular or oblong slit, or a slit having a profile substantially complementary to the section of the support 41. The opening SL may, however, have some other shape designed for the purpose, in particular a shape designed to enable at least part of the support 41 and/or the corresponding electrodes 42 to be arranged so as to come into contact with the liquid, preferably in a position such as to be lapped by the flow of the liquid.

Figure 12:
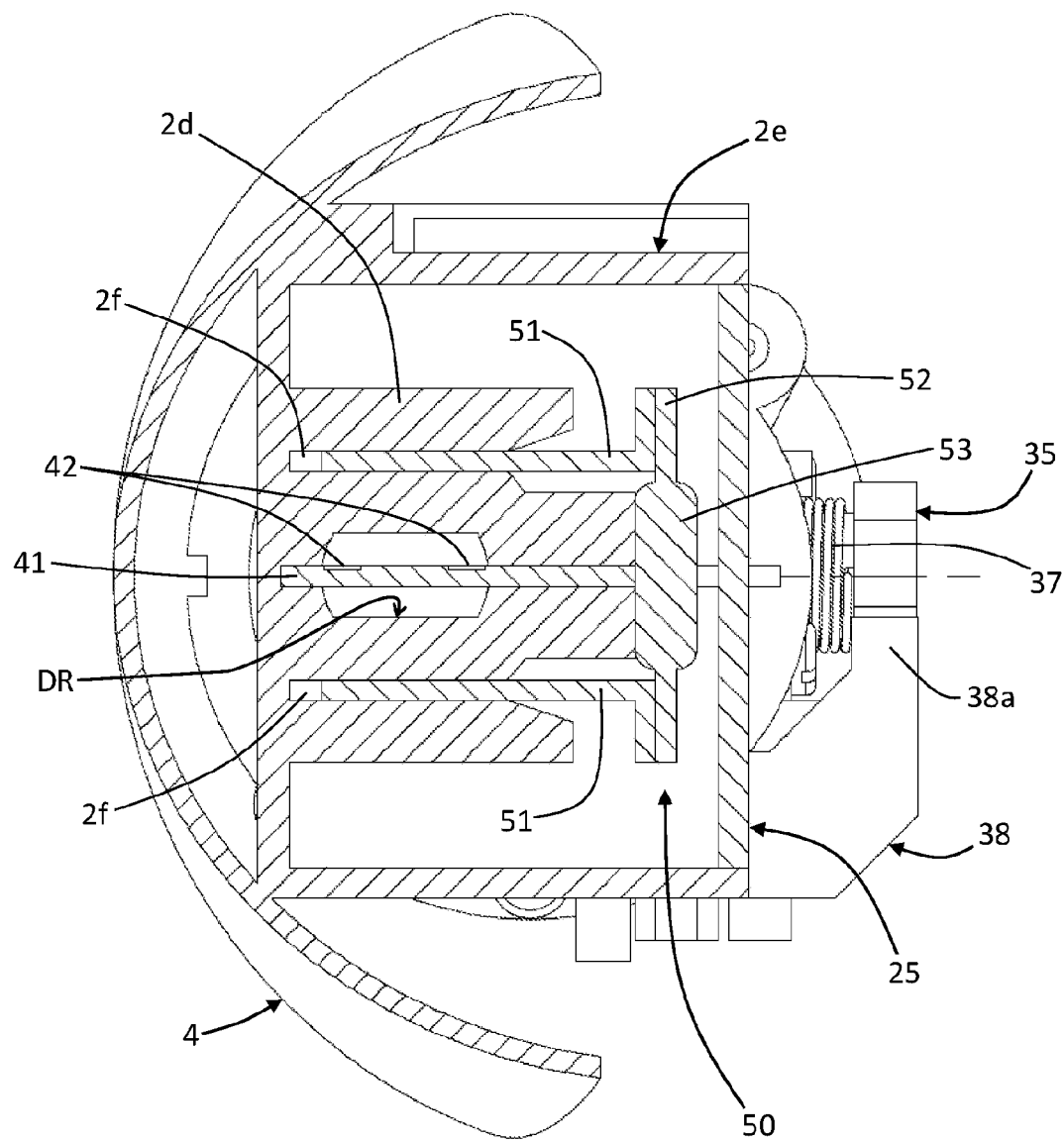
FIG. 12 is a schematic cross-sectional view of a first functional unit of a hydraulic control device according to possible embodiments of the invention.

The opening SL is defined at the aforesaid detection region of the duct, designated by DR in FIG. 11, and is preferably formed at a massive formation of the body 2', such as the one designated by 2d in FIGS. 10-12. In various embodiments, the support 41 is inserted in a transverse direction through the openings SL, with its major faces substantially parallel to the direction of the flow of the water. The support 41 may be inserted or positioned in such a way that its central region, in which the electrodes 42 are located, is within the duct part 30a, or is in any case in a position such that it can be lapped by the liquid.

The distal end of the support 41 may be inserted in a blind seat, designated by SD in FIG. 11, defined in the detection region DR in a position opposite to the opening SL. Preferably, provided at the through opening SL are means designed to guarantee fluid tightness between the support 41 and the body 2', these means possibly comprising gaskets made of elastomeric material and/or a sealant material applied locally, for example a resin (of an epoxy, or acrylic, or mono-component, or bi-component type), or a polymeric or elastomeric overmoulding.

In order to guarantee fluid tightness between the support 41 and the body 2', the material of the support 41 is substantially impermeable to liquid, possibly operating as element for closing the opening SL, in particular with the aid of the aforesaid sealing materials and/or sealing elements that operate between at least one surface of the support 41 and at least one wall of the body 2' at the opening SL, such as a wall of the aforesaid massive formation 2d.

In various embodiments, the duct for the water may be shaped in such a way that its stretches upstream and downstream of the detection region DR have variable sections of passage. In the example illustrated in FIG. 11, the duct—here its part 30a—is shaped so as to have a stretch $DR_{IN}$ in which the section of passage of the duct part 30a, or at least a dimension in width of the duct, decreases or narrows as far as the detection region DR, where the electrodes 42 are located, which is followed by an adjacent stretch $DR_{OUT}$, in which the section of passage of the duct part 30a, or at least a dimension in width of the duct, widens again, preferably substantially up to its original section. The section of passage in the detection region DR is preferably smaller both than the initial section of passage of the stretch $DR_{IN}$ and than the final section of passage of the stretch $DR_{OUT}$. The aforesaid variation in the section of passage presents the advantage that the speed of the flow of liquid increases in the detection region DR where the electrodes 42 are located, and, consequently, in this area a more marked effect of separation of charge caused by the magnetic field is obtained, which facilitates detection of the potential difference.

In various embodiments, the detection region DR of the duct—here of the duct part 30a—has a substantially oblong, or substantially rectangular or elliptical, section, and the support 41 is inserted, or in any case set, in the aforesaid region DR in a direction substantially parallel to the major dimension of the oblong section. With reference to the example illustrated in FIG. 12, the oblong section is at least approximately rectangular or elliptical. The electrodes 42 may, in this way, be positioned as far as possible from one another, albeit within the restricted section of passage of the duct for the liquid, in the detection region DR. The distance between the electrodes 42 enables increase in the sensitivity of measurement of the potential difference. Given that the potential difference is substantially proportional to the transverse dimension of the section of passage of the water exposed to the magnetic field, an increase in the transverse dimension enables increase in the sensitivity of measurement.

To return to FIG. 7, in the proximal end region of the support 41 the connection pads 45 are provided, substantially arranged as a male multipolar connector of an edge-connector type. In the case exemplified, this connector, or the support 41, is shaped to define an intermediate recess, designated by IR only in FIG. 7, which makes it possible to receive therein a corresponding intermediate portion of the coil 53 of the electromagnetic arrangement 50, to the advantage of reduction in the overall dimensions.

In various embodiments, the connector including the pads 45 is mechanically and electrically coupled to a corresponding circuit support or PCB, such as the one designated by 25 in FIGS. 5-6 and 9-11, on which there may also be possibly mounted various electrical and electronic components for treatment and/or conditioning and/or processing of the signals generated via the electrodes 42 and the possible measurement coil 46-46a, as well as for supply of the coil 53 of the electromagnetic arrangement 50. The aforesaid components could on the other hand be provided entirely or in part on the PCB 19, instead of on the PCB 25. The pads 45 may be electrically connected to the signal-conditioning electronics on the PCB 25 via direct soldered connection, or else by means of conductive glues, or else again by means of a dedicated connector provided on the PCB 25.

The PCB 25 is preferably connected to the PCB 19 via a multi-conductor cable 26 (including the conductors 54 of FIG. 7), for example via a male-female connector system 27. The PCB 19 is, in turn, connected via conductors 19a (FIGS. 9 and 10) to the contacts 8 (FIG. 3), for receiving the necessary electrical supply via the battery 6.

In various embodiments, the body of the device 1 is shaped for defining a housing for at least part of the components of the flow-rate meter 40-50, and in particular at least its electromagnetic arrangement 50, and preferably the PCB 25. For this purpose, the body 2' of the sensing unit 2 may define a box-like volume or housing, designated by 2e for example in FIGS. 2, 5, and 9-11. Preferably, the formation 2d in which the through opening SL for the support 41 is defined projects into the housing 2e. The PCB 25 is preferably mounted at an open end of the housing 2d, substantially so as to close the latter. In various embodiments, the support 41 and the corresponding electrodes 42 could be integrated in the support 25, or vice versa.

Also the electromagnetic arrangement 50 is mounted on the outside of the duct part 30a, in particular at the detection region DR. For this purpose, the body 2' may conveniently define mounting seats for the two yokes 51. Examples of these seats are visible in FIGS. 12 and 13a, 13b, where they are designated by 2f. The electromagnetic arrangement 50, and hence also the yoke 52 and the coil 53, may be entirely supported via the body 2', even though not excluded is also a mechanical connection—for example, of the coil 53 and/or of the yoke 52—also to the PCB 25. Visible in FIGS. 12 and 13a-13b is a preferential arrangement of the yokes 51, set parallel to one another with the detection region DR set in between in order to direct through the latter the magnetic field used for the purposes of detection of the flow, i.e., of measurement of the flow-rate.

Possible operation of the flow meter used in a hydraulic control device according to the invention is described in what follows.

With the valve arrangement of the device 1 in an opening condition, and following upon opening of the tap WN of FIG. 1, a flow of water penetrates into the device itself, from the inlet IN, i.e., through the fitting 2a. The flow of water coming from the water mains then passes into the inner duct 30a-30b of the device, flowing through the detection region DR, and then exits through the outlet OUT, i.e., the fitting 3a, and reaches the appliance UA.

The presence of a magnetic field transverse to the flow of the water—represented schematically in FIG. 13a by the arrows transverse to the detection region DR—causes the electrical charges present in the water (ions) to undergo an electromagnetic force that pushes them in opposite directions according to whether their charge is positive or negative. For example, with reference to FIG. 13b, all the positive charges will move according to the arrow "+" and all the negative charges will move according to the arrow "−". If the magnetic field is reversed, the electrical charges of the water will move in the opposite way.

Displacement of the electrical charges is present only if the flow-rate of water is other than zero, and the degree of displacement of the charges is proportional to the flow-rate; i.e., the higher the flow-rate of water, the higher the amount of electrical charges that will move. Displacement of the electrical charges towards the minor sides of the detection region DR will create a potential difference between the electrodes 42 present on the support 41, which is proportional to the flow-rate of the flow that is passing through the magnetic field.

The signal across the electrodes 42 reaches the PCB 25 (via the corresponding conductive tracks 44₂ and the pads 45—FIGS. 7-8), where it is conditioned via the components present on the PCB 25 itself. The electrical signal representing the value of flow-rate is then transmitted from the PCB 25 to the PCB 19, via the wiring 26, for the necessary processing (as has been said, conditioning and/or processing components could be present on the PCB 19). The circuit on the PCB 25 may advantageously be configured in such a way that the corresponding output signal, i.e., the signal sent to the circuit implemented on the PCB 19, is of a digital type (for example, with UART protocol), with a numeric value proportional to the value of flow-rate.

It should be noted that the modalities of treatment, processing, and transmission of the data may be obtained according to any known modality. For example, preferably, calculation of the value of flow-rate on the basis of the potential difference detected at the electrodes 42 and of the parameters known beforehand (size of the section of passage in the detection region DR and intensity of the magnetic field generated by the arrangement 50) may be made by purposely provided components present on the circuit support 19 (for example, via an electronic controller, such as the one designated by MC in FIG. 10). In any case, on the basis of the value of flow-rate, the circuit arrangement implemented on the PCB 19—preferably comprising the aforesaid controller MC and non-volatile memory means—is able to measure the amount or volume of water that has passed through the device itself. When the amount of water measured is higher than a given threshold value (or else the flow-rate of water falls outside a pre-set range of values deemed normal, i.e., it is too low or too high), the circuit arrangement will control closing of the valve arrangement of the device 1, for example, according to the modalities described hereinafter.

In various embodiments, the circuit belonging to the PCB 19 is configured for receiving the signal representing the flow-rate or flow of the liquid from the PCB 25 and, via a suitable dedicated program, for example implemented in the controller MC, for managing possible alarm signals, in addition to controlling closing of the valve arrangement belonging to the unit 3. The aforesaid circuit may optionally envisage also transmission of an alarm signal to a user in wireless mode, for example, via Bluetooth or Wi-Fi communication, in which case the circuit will be provided with a corresponding transmitter or transceiver. Closing of the valve arrangement could also be imparted via a specific remote command, once again in wireless mode, for example via a suitable remote device (for instance, a dedicated remote control, a smart phone, a tablet, a personal computer, etc.) equipped with a corresponding wireless transceiver. As has already been said, the electronics for conditioning the signal obtained via the electrodes 42 and the electronics necessary for controlling closing of the valve arrangement of the device 1, as well as for managing the possible alarm warnings, may be provided on a single PCB, for example, the PCB 19.

As has been mentioned, in various embodiments, also provided on the support 41 of the detection arrangement 40 is a sensor of magnetic field, represented by the coil 46-46a (FIGS. 7-8), which is set in a position substantially corresponding to the electrodes 42, and in any case within the magnetic field generated by the arrangement 50. Across this coil, i.e., the corresponding pads 45, it will hence be possible to detect a potential difference representing the intensity of the magnetic field produced by the yokes 51. This electrical value may, for example, be processed by the electrical/electronic components present on the PCB 19 and/or on the PCB 25 in order to supply information on the effective intensity of the magnetic field in the area of the electrodes 42, and thus have the possibility of evaluating the presence of possible problems of the electromagnetic system. The information on the effective intensity of the magnetic field, as measured by the coil 46-46a, may advantageously be used by the control logic (whether it is implemented on the PCB 19 or on the PCB 25) for the purposes of calculation of the value of flow-rate, i.e., with a logic of an adaptive type, whereby the value representing the intensity of the magnetic field is a parameter that can be updated each time on the basis of the measurements made via the coil 46-46a.

As mentioned, in various preferred embodiments, at least the yoke 52 may be made of a semi-hard material, i.e., a material with high remanent magnetization. Materials of this type make it possible to maintain the magnetic field for a certain time even when supply of the coil 53 ceases, this being advantageous in view of a reduction in consumption of electrical energy, in particular when the device envisages an autonomous source of electrical energy (such as a battery 6 as described hereinafter). For example, in various embodiments, the pulses for supply of the coil 53 will occur at short time intervals, preferably shorter than one second (for example, 750 ms). Use of a semi-hard material enables application of such a pulse of the duration of some microseconds and guarantee the existence of the magnetic field for the rest of the time necessary. As may be appreciated, this enables energy saving, which is useful in the case of electrical supply with a battery or the like.

Possibly, if a semi-hard material is used for the yoke 52, the control electronics of the electromagnetic arrangement 50 may be prearranged for supplying the coil 53 so as to generate a first magnetic field and then interrupt supply, in any case guaranteeing existence of a certain magnetic field for a certain time interval following upon interruption of the supply. Preferably, but not necessarily, the control electronics may also be prearranged for measuring the magnetic field that remains in the aforesaid time interval (for example, via the aforementioned measurement coil or the aforementioned Hall-effect sensor) to establish the decay thereof with the coil 53 not supplied, for example in order to compensate the measurements of magnetic field and/or establish when to re-activate supply to the coil 53.

As mentioned previously, in various embodiments of the invention, the valve arrangement provided by the device 1 is supplied electrically and may envisage for this purpose the use of an actuator element 16 made of shape-memory alloy, i.e., an actuator of an electro-thermal type. As an alternative to an actuator of this type, it is also possible to use other electro-thermal actuators, such as known bimetal actuators, or else known thermal actuators based upon the use of an expanding material, such as a wax (for example, of the type described in EP0940577 A filed in the name of the present Applicant). Use of a thermoelectric actuator for controlling the valve arrangement of the device is particularly advantageous in combination with an electromagnetic-induction flow meter, since in this way the risk of perturbations of the magnetic field generated by the electromagnetic arrangement 50 of the flow meter is reduced. These perturbations could instead exist in the case where the valve arrangement of the device 1 were of an electromagnetic type, i.e., based upon the use of an electric motor or a solenoid.

Figure 18:
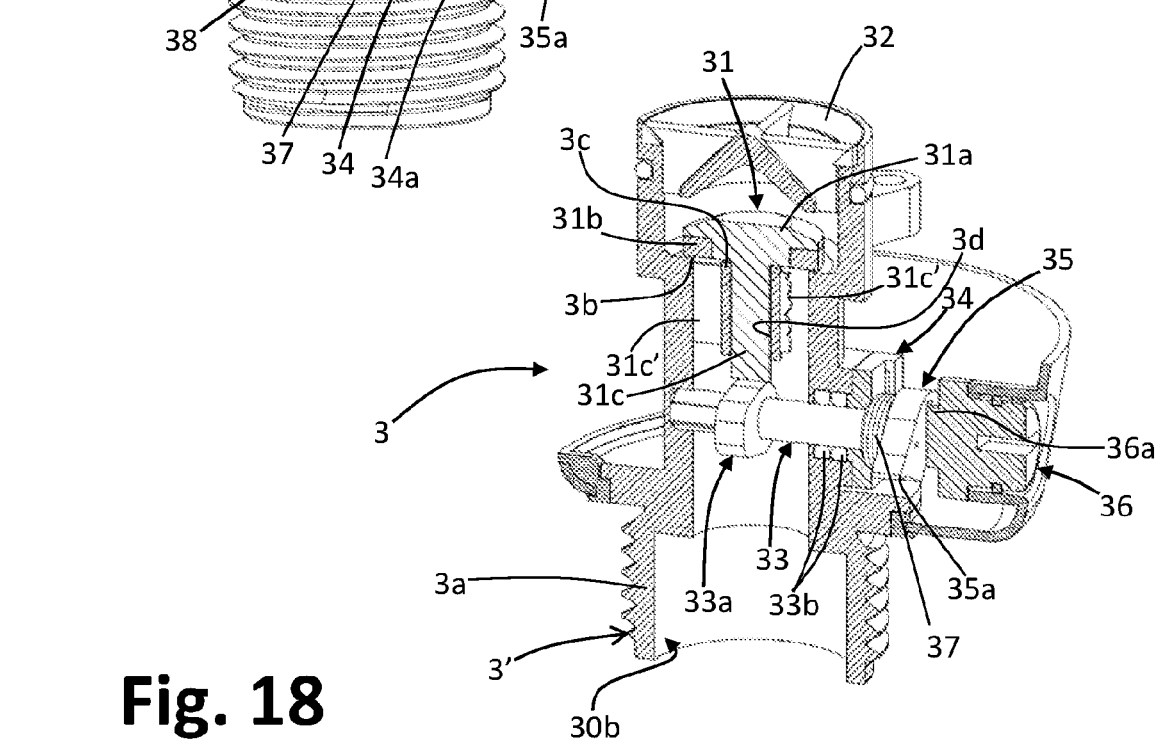

With reference in particular to FIGS. 6, 16, and 18, in various embodiments, mounted inside the body 3' of the valve unit 3 is a valve member 31, preferably movable in an axial direction with respect to the body itself and parallel to the flow of the liquid in the duct 30a-30b. Preferably, the valve member 31 comprises a head 31a, associated to which is a gasket or similar sealing element 31b, designed to co-operate in closing on an underlying valve seat 3b (FIG. 6) defined in the duct 30a-30b.

The valve seat 3b is preferably defined at a restriction of the duct 30a-30b, and has, for example, the shape of a rim in relief facing the gasket 31b. In various embodiments, provided downstream of the valve seat 3b, substantially coaxial to the duct, is a tubular element, designated by 3c in FIGS. 16 and 18, defining a seat 3d slidably inserted in which is a stem or shaft 31c of the valve member 31. The tubular element 31c is supported in position within the duct via a series of radial spokes or walls, some of which are designated by 31c', for example, substantially arranged to form a cross.

In various embodiments, provided in the duct for the liquid, upstream of the valve member 31, is a deflector element 32, for example with radial blades. The function of the deflector element 32 is to prevent an excessive thrust of the liquid on the valve member 31, in particular on its head 31a.

The valve arrangement comprises a mechanism for control of the valve member 31, which can be driven by means of the electric actuator, here the wire actuator 16, in particular for the purposes of passage of the valve member 31 from the position of opening to the position of closing of the duct 30a-30b. As will emerge more clearly hereinafter, in preferred embodiments of the invention, reset of the device (i.e., displacement of the valve member from the aforesaid closing position to the aforesaid opening position) must be made manually. According to other embodiments, not represented, reset of the device 1 may be made in some other way, for example, via a further electric actuator, or else with a different mechanism that controls both closing of the duct and its re-opening via a single actuator. A reset of a manual type must in any case be deemed preferable in order to enable a technician or operator required to carry out reset to ascertain the causes of triggering of the safety mechanism of the device 1.

In various embodiments, the aforesaid control mechanism comprises a retention element for retaining the valve member 31 in the opening position, which is associated to a corresponding movable element, in particular a rotary shaft or pin, which extends in a direction transverse to the axis of the duct 30a, 30b, at least in part inside it. The aforesaid pin is, in turn, associated in rotation to a corresponding control element, preferably substantially of the cam type, which is located on the outside of the duct and interacts with an engagement/disengagement lever that can be driven via the actuator 16. The aforesaid pin and control element, and hence the retention element, are preferably subject to the elastic reaction of a spring, which urges them towards the condition of release of the valve member. The engagement/disengagement lever, which is preferably a rocker lever hinged so as to turn according to an axis substantially perpendicular to the axis of rotation of the pin, is connected to the actuator 16 and is in turn subject to the elastic reaction of a spring, which urges the lever itself to turn in a opposite direction to the one determined by the action of the actuator.

Figure 14:
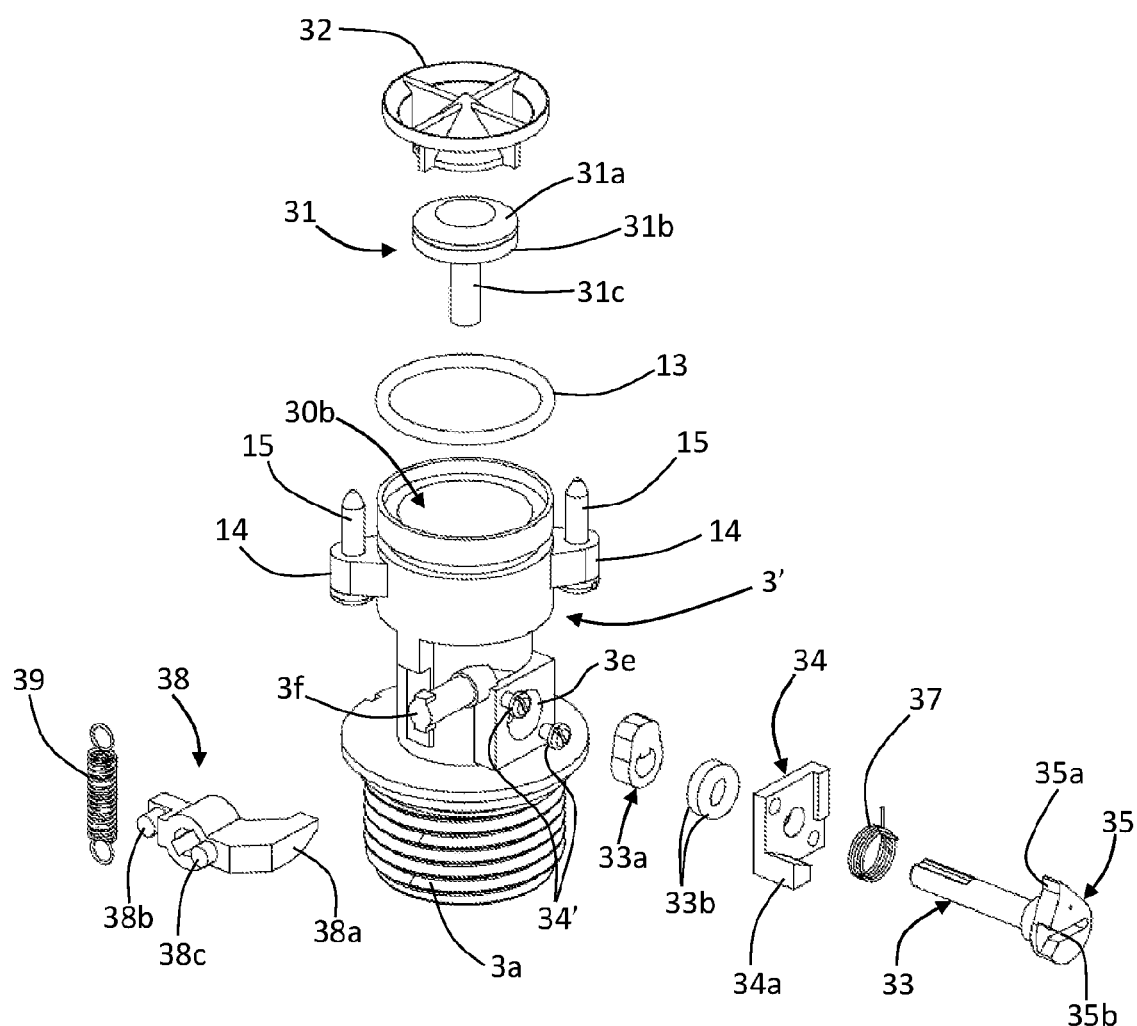
FIG. 14 is an exploded schematic perspective view of a second functional unit of a hydraulic control device according to possible embodiments of the invention.

A possible embodiment of the aforesaid control mechanism of the valve member 31 is visible in exploded view in FIG. 14 and, in two different conditions, in FIGS. 15-16 and 17-18, respectively.

In the case exemplified, the lower end of the valve member 31, i.e., the lower end of its stem 31c, rests on a retention element designated by 33a, which is located within the duct for the liquid (here its part 30b). This retention element may, for example, be an eccentric or cam support, resting on the outer profile of which is the stem 31c of the valve member 31. The retention element 33a is associated to a pin 33 so as to rotate therewith. The pin 33 is mounted on the body 3' in such a way that it can turn about its own axis, so as to extend at least in part within the duct for the liquid, in a direction transverse thereto (i.e., substantially perpendicular to the stem 31c of the valve member 31).

The pin 33 is inserted in the body 3', as far as inside the duct part 30b, by means of a lateral opening of the body 3', designated by 3e in FIG. 14. On this transverse opening 33 there may be provided at least one sealing element 33b, for example one or two gaskets of an O-ring type, in order to prevent leakage of liquid towards the outside of the body 3'. The sealing element or elements 33b may be held in position within the opening 33 via a small lid 34 or the like, fixed with screws 34' (see in particular FIG. 14) or other fixing methods, for example slotting.

As will be seen hereinafter, the rotary pin 33 can turn about its own axis when the valve arrangement of the device 1 is driven. In this way, the retention element 33a can be displaced from a generally raised working position thereof (visible, for example, in FIGS. 6 and 16), to a generally lowered position of release (visible, for example, in FIG. 18). When the retention element 33a is in the aforesaid working position, the gasket 31b of the head 31a of the valve member 31 is at a distance from the valve seat 3b, thus enabling flow of the liquid through the section 3d of the duct part 30b. Instead, when the retention element 33a is in the aforesaid position of release, the valve member 31—pushed by the inflowing liquid and/or by a possible return spring (not represented)—can displace downwards, until the gasket 31b of its head 31a comes to rest on the valve seat 3c, thereby preventing flow of the liquid towards the outlet fitting 3a. As will be seen, the retention element 33a may then be brought back into the raised working position by means of a manual intervention on a reset member 36, which is preferably accessible from the outside of the casing of the device.

The pin 33, at its end opposite to the one inserted in the duct part 30b, has a substantially cam-shaped control element 35, which may be made of a single piece with the pin 33 or else be configured as distinct part fixed to the corresponding end of the pin 33. In various embodiments, the control element 35 is designed to co-operate with an actuation lever, which can be driven via the actuator 16, and with the aforementioned reset member. In the case exemplified, the control element 35 defines, in at least a portion of its peripheral profile, a respective cam or sliding surface that includes a projection 35a. The element 35 moreover has at the front a seat 35b, which may be defined by a transverse slit—as represented in the figures—or by a substantially central blind cavity, with non-circular profile. In this seat 33b, a corresponding projection 36a of the aforementioned reset member, designated as a whole by 36, is to be coupled.

Coupling between the seat 33b and the projection 36a of the reset member 36 (or, more in general, mechanical coupling between the elements 35 and 36, which could also be made of a single piece) is such that a rotation imparted manually on the member 36 will be transferred to the control element 35, which can turn accordingly and cause rotation along with it of the pin 33 and of the corresponding retention element 33a. Likewise, a rotation of the element 35 is transferred to the member 36.

Preferably, the control element 35 is urged in rotation by an elastic element, with the pin 33, towards a position corresponding to the position of release of the retention element 33a. In the example illustrated, the elastic element comprises a torsion spring 37, interacting between the element 35 and the body 3', i.e., the lid 34 fixed to the body 3'.

Figure 3:
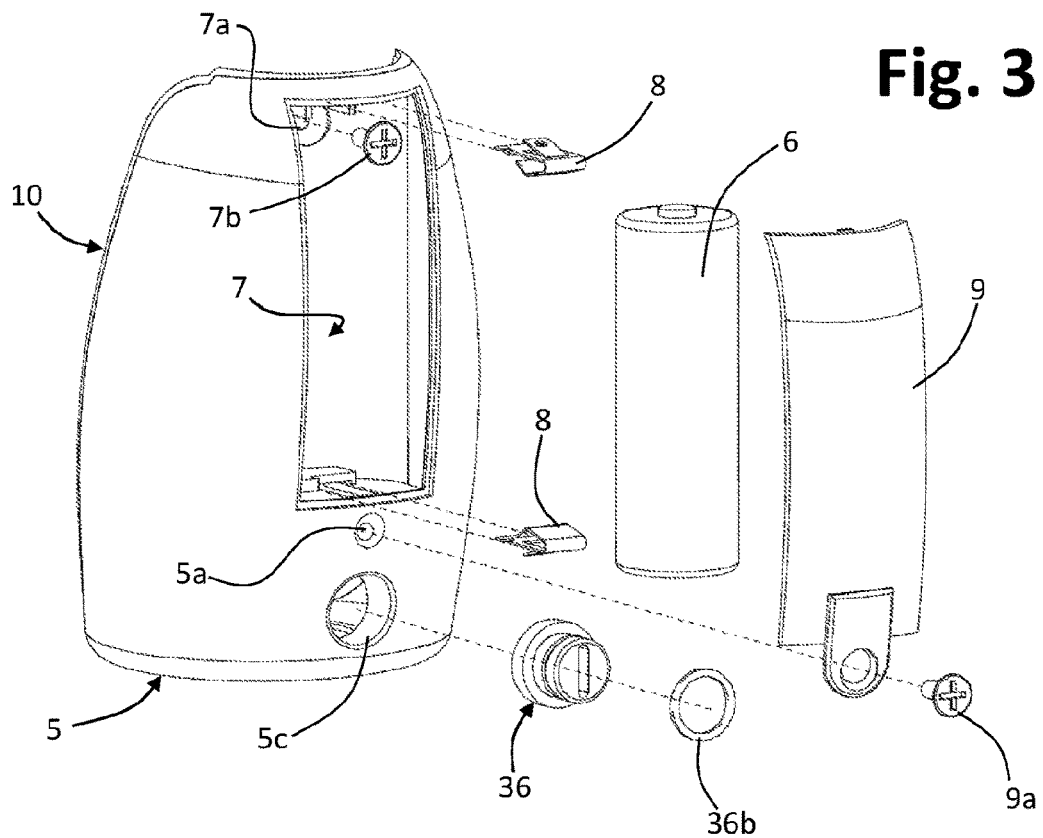
FIG. 3 is an exploded schematic perspective view of a casing part of a hydraulic control device according to possible embodiments of the invention.

The reset member 36 preferably has at least a part of its peripheral profile that is generally cylindrical, or in any case such that it can be received in a corresponding seat provided on the casing part 5, such as the tubular seat 5c of FIGS. 3 and 4, and turn therein. In this way, the end of the reset member 36 opposite to the control element 35 may be accessible from the outside of the casing 4-5 of the device 1, as may be clearly seen, for example, in FIGS. 1-2. This accessible end is conveniently shaped to make it possible to impart in an easy way a rotation on the member 36. In the case exemplified in the figures, for this purpose a transverse notch is provided in such a way that the aforesaid rotation can be imparted on the member 36 via a screw driver or similar tool. Instead of such a notch, in the reset member 35 (or directly in the control element 35, if it is made of a single piece) there could provided a seat of a shape different from the one illustrated, for example cross-shaped, hexagonal, or polygonal, or substantially star-shaped, or else a projecting part, that can be gripped directly by a user, for example using a knob, or that can be actuated via a tool or a wrench, for example of a polygonal or star shape or with at least two parallel sides. Preferably, set between the part of the member 36 inserted in the corresponding seat 5c and the cylindrical wall of the seat is a sealing element 36b, such as an annular gasket.

The control element 35 and the reset member 36 have been described in the preferential version as being of a rotary type, but they could also be of some other type, for example of a slidable type. For instance, in possible embodiments, the element 35 and the corresponding pin 33 are of a slidable type, in particular linearly slidable along the axis of the pin 33, and the stem 31c of the valve member 31 is configured for resting on the pin 33 in order to maintain the valve member 31 at a distance from the valve seat 3b, thus enabling flow of the liquid (in this case it is hence not indispensable to provide the retention element 33a, its functions being carried out by the pin 33). In this case, following upon an actuation command, the control element 35 slides linearly in such a way that the stem 31c of the valve member 31 will no longer rest on the pin 33, consequently leaving the valve element 31 free to displace into contact with the valve seat 3b so that it closes the duct.

Mounted alongside the body 3' is a stop element 38, having one end 38a designed to interact with the projection 35a of the control element 35. The stop element, here configured substantially as a rocker lever, is hinged to a corresponding pin 3f defined by the body 3' or associated thereto, which preferably extends substantially perpendicular to the pin 33. The end of the lever 38 opposite to the end 38a has a pin or similar element 38b for anchorage of the first end of a reset element, such as a spring 39, in particular a helical spring, the other end of which is anchored to a corresponding pin or similar engagement element 2g defined in the body of the device or rendered fixed with respect thereto (here the body part 2', see for example FIGS. 2 and 5). The lever 38, in its arm that includes the end 38a, comprises a further pin or similar element 38c for anchorage of the second end of the shape-memory actuator element 16 (see, for example, FIG. 2).

In FIGS. 15 and 16 the device 1 and the valve unit 3 are shown in the position of opening of the duct for the liquid.

In this condition, the wire actuator 16 is not electrically supplied, and the torsion spring 37 tends to cause rotation—here in a counter-clockwise direction—of the ensemble constituted by the pin 33 with the retention element 33a, the control element 35, and the reset member 36. This ensemble is, however, prevented from turning, in view of the interference between the end 38a of the lever 38 and the projection 35a of the control element 35, in particular of the cam surface defined on the control element 35. The lever 38 is kept in this stable position thanks to the action of the spring 39, which here tends to cause rotation of the lever itself in a clockwise direction, and in part of the wire actuator 16.

As may be seen in particular in FIG. 16, in this stable condition, the pin 33 is in a position such that the associated retention element 33a is located in its working position, substantially vertical or upright, with the lower end of the stem 31c of the valve member 31 that rests on the most eccentric part of the peripheral profile of the element 33a itself. The gasket 31b of the valve member 31 is hence raised with respect to the valve seat 3b, thus enabling passage of the flow.

Possible operation of the valve arrangement of the device 1 is described hereinafter.

In the presence of a continuous flow of the liquid, the control electronics of the device calculates, via the flow meter 40, 50, the flow-rate of the liquid itself and from this the amount of liquid that has passed through the device 1. When—in conditions of constant flow—an amount of liquid is detected higher than a given safety limit, or else when the flow-rate detected falls outside a predefined range of values (hence a flow that is too low or too high), the control electronics drives closing of the valve arrangement. For this purpose, via the circuit implemented on the PCB 19, the wire actuator element 16 is supplied, and this, heating by the Joule effect, undergoes deformation, in particular contracts or shortens (as has been mentioned, alternatively an electrical heater associated to an actuator element made of shape-memory alloy could be provided, where heating caused by the heater brings about heating of the element made of shape-memory alloy, and hence consequent contraction thereof).

Figure 17:
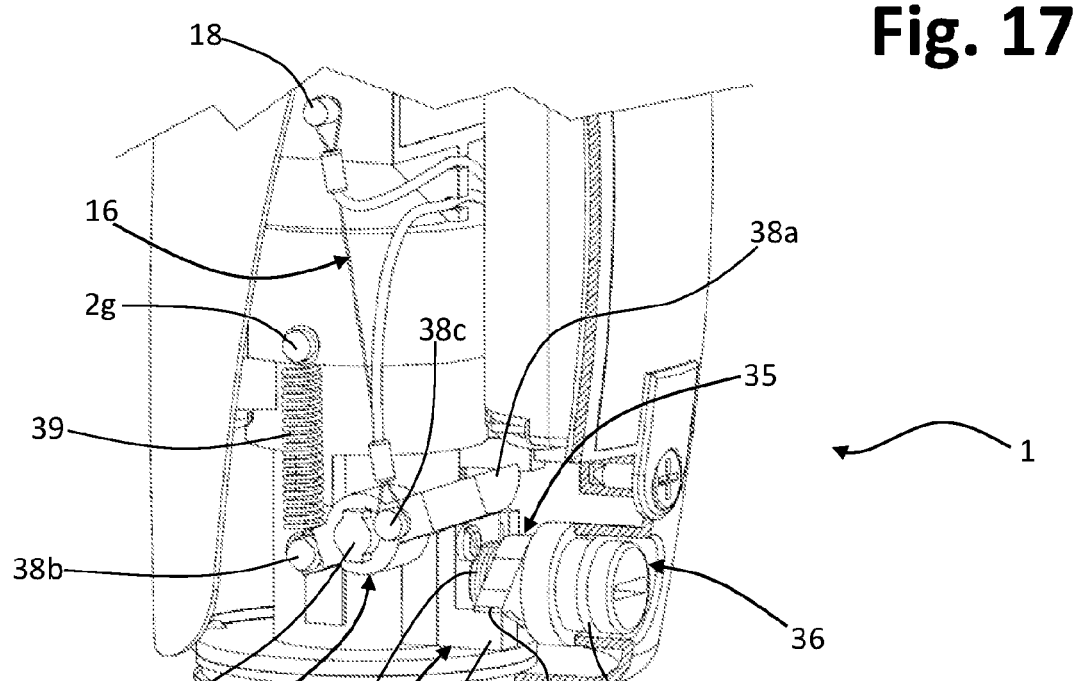
FIGS. 17 and 18 are views similar to those of FIGS. 15-16, with the device and the aforesaid first unit in a second condition.

Deformation of the wire causes angular movement of the lever 38, in contrast to the action of the spring 39. With reference also to FIGS. 17 and 18, rotation of the lever 38 here is made in a counter-clockwise direction. Following upon this rotation, the end 38a of the lever 38 is released from the projection 35a of the element 35, with the latter that is hence forced to turn—here in a counter-clockwise direction—under the action of the spring 37. Rotation of the element 35 can be arrested by means of a suitable contrast or stop element, for example, the one designated by 34a, here defined by the lid 34.

Rotation of the element 35 causes corresponding rotation of the reset member 36, on one side, and of the pin 33, on the other side. The retention element 33a associated to the pin hence assumes its position of release, as may be seen in FIG. 18, enabling the valve member 31 to drop down, under the thrust of the inflowing liquid (and of a possible spring, not represented). The gasket 31b rests on the valve seat 3b, preventing any further flow of the liquid.

Following upon closing of the valve arrangement, the control electronics belonging to the PCB 19 interrupts electrical supply to the wire actuator 16. Electrical supply to the actuator 16 can be controlled in time, given that only a few seconds are necessary to obtain a contraction of the wire made of shape-memory alloy from its extended condition to the contracted condition such as to cause rotation of the lever 38, or else a suitable sensor (for example, a micro-switch) may be provided designed to detect reaching, for example by the lever 38 or the element 35, of a position corresponding to the one represented in FIGS. 17-18. Possibly, an effective closing of the valve member could be detected by verifying absence of a flow; i.e., the electrical command of the actuator 16 could be determined on the basis of signals of the flow meter.

Following upon interruption of supply, the wire actuator 16 cools down and assumes again the original extended condition, with the lever 38 that, also under the action of the spring 39, returns into its initial position, as may be seen in FIGS. 15-16. The cam element 35 and the pin 33 with the associated retention element 33a remain, however, in the position of FIGS. 17-18, also under the action of the spring 37, with the valve member 31 that hence remains in a position of closing of the duct for the liquid, even in the absence of electrical supply (in particular, without consumption of energy by the battery 6).

Reset of the valve arrangement may then be made manually by acting on the reset member 36, i.e., imparting on the latter a rotation opposite to the one that had occurred during closing, aimed at causing rotation also of the cam element 35 (which is fixed in rotation with respect to the member 36, via the coupling 35b-36a) and the associated pin 33, which carries the retention element 33a. The rotation thus imparted on the retention element 33a, which in the example occurs in a clockwise direction, causes the corresponding interaction of its peripheral profile with the lower end of the stem 31c of the valve member 31, bringing the member 31 back into the respective condition of opening of the duct for the liquid, as represented in FIGS. 15-16. In this step, rotation of the cam element 35 is such that the corresponding projection 35a interferes with the end 38a of the lever 38, determining a temporary rotation thereof upwards, until the end 38a—urged in this direction by the spring 38—again engages the projection 35a, as in the initial condition of FIGS. 15-16. The valve member 31 is hence reset, i.e., kept once again in the respective condition of opening of the duct for the liquid.

It will be appreciated that, even more advantageously, in various embodiments of the device according to the invention, the valve arrangement, or the control mechanism of the valve member, can be reset without the need to disconnect the fittings 2a and 3a from the source of the liquid (such as the tap WN of FIG. 1) or the appliance or system supplied thereby (such as the appliance UA including the pipe visible in FIG. 1). On the other hand, as mentioned, the control mechanism of the valve member of the valve arrangement of the device 1 could be of a type different from the one illustrated herein by way of example, and devised for a manual reset thereof after prior disconnection from the source of the liquid or the appliance or system supplied thereby (in this case, for example, part of the mechanism can be reached for enabling reset thereof through at least one between the inlet fitting 2a and the outlet fitting 3a).

As has been seen, the hydraulic control device according to the invention is able to detect the flow or flow-rate of liquid directed to a generic appliance or system, and, on the basis of the value of this flow or flow-rate detected, act according to a given operating logic.

In various embodiments, this operating logic is pre-set or stored in the production stage. For this purpose, the control electronics of the device may be programmed by setting beforehand a pre-set range of flow-rate (for example, a minimum flow-rate and a maximum flow-rate) envisaged for use of the device, in particular in view of the type of application, and/or a predefined or maximum volume of liquid, i.e., the aforementioned safety limit. In this case, one or more of the following conditions of activation of the device 1 may be envisaged:

i) the flow-rate detected by the flow meter is lower than the minimum value of the pre-set flow-rate range: this means that a first type of fault of the hydraulic system in which the device is included is present, in particular downstream of the device 1 (for example, an undesirable leakage of water within the appliance UA of FIG. 1); in this case, the control logic can issue a command for supply of the actuator 16 to cause closing of the valve arrangement and/or generate an alarm signal;

ii) the flow-rate detected by the flow meter is greater than the maximum value of the pre-set flow-rate range: this means that a second type of fault of the hydraulic system in which the device is included is present, in particular downstream of the device 1 (for example, failure of the pipe for supply of the appliance UA of FIG. 1); also in this case, the control logic can issue a command for supply of the actuator 16 to cause closing of the valve arrangement and/or generate an alarm signal;

iii) the flow-rate detected by the flow meter in the presence of a continuous flow is within the pre-set flow-rate range, but the total amount of water introduced reaches or exceeds the predefined or safety limit, which is indicative of a third type of condition or fault, in particular downstream of the device (for example, an excessive consumption of the appliance UA of FIG. 1 or reaching of the predefined amount of liquid at which the flow is to be interrupted); in this case, the control logic preferably issues a command for supply of the actuator 16 to cause closing of the valve arrangement and, if envisaged, generates an alarm signal;

iv) the control electronics of the device detects—with modalities in themselves known—that the autonomous source of supply of the device 1, such as the battery 6, has run out, i.e., is below a predefined safety threshold; also in this case, the control logic issues a command for supply of the actuator 16 to cause closing of the valve arrangement, basically for reasons of safety, and/or generate an alarm signal.

Following upon these situations of activation, the device 1, i.e., its valve arrangement, can be manually reset by the user as explained above, in particular after the cause of the fault has been verified.

In various embodiments, the control electronics of the device may be prearranged for being programmed at least in part by the end user, also with the possibility of communication of information and alarm signals in wireless mode. In this case, the control electronics will preferably comprise a wireless transceiver (for example, Bluetooth or Wi-Fi and/or a gateway for connection to the Internet).

Also in embodiments of this type, the control electronics is programmed by setting beforehand at least one of a flow-rate limit or range (for example, minimum and maximum flow-rate) and a maximum volume of liquid (safety limit), but these parameters can be modified by the end user, via the communication circuitry of the device 1 and an external electronic device of the type mentioned previously, in particular in order to vary the factory settings (i.e., the flow-rate range and/or the safety limit) and/or query the device on alarm states or other information regarding the consumption of liquid and/or receive remotely alarm warnings (for example, triggering into closing of the valve arrangement and/or warning on the low state of charge of the battery 6). The conditions of activation of the device 1 may be the same as those indicated above in points i), ii), iii), and iv). It is obviously possible to issue also a remote command for closing of the valve arrangement, by sending a suitable command by the aforesaid external electronic device. Also in the case where the device is provided with a communication electronics, for reasons of safety, it is in any case preferable that resetting of the valve arrangement will be carried out manually, for example with the modalities mentioned previously.

In various embodiments, the circuit arrangement of the device 1, for example its part implemented on the PCB 19, may be prearranged for the purposes of writing and/or communication and/or modification of parameters useful or necessary for optimizing operation of the device itself, in particular of its non-mechanical flow meter.

For this purpose, for example, the aforesaid circuit arrangement may include a connector or contacts that can be used for the purposes of programming and/or complete functional testing of the safety device, i.e., for the purposes of connection to a specific programming and/or testing equipment.

Preferably, the aforesaid equipment may be prearranged in order to write or update in a non-volatile memory of the device 1—for example, an EEPROM—one or more parameters designed to regulate operation of the circuit arrangement 40, 50, in particular of its part designed for measurement of flow-rate. The aforesaid parameter or parameters may be written by the programming and/or testing equipment, via the aforesaid connector or contacts, in purposely provided cells of the aforesaid non-volatile memory, according to common writing methodologies. In other embodiments, this programming could be made in wireless mode, without the addition of physical contacts.

In various embodiments, the aforesaid parameter or parameters comprise at least one calibration parameter aimed at offsetting any possible production spread, due to the tolerances of the components used for obtaining the device 1 and/or of the processes used for its production.

A possible logic regarding the calibration parameter is described in what follows. During testing of the device 1, the value of flow-rate of liquid measured via the non-mechanical flow meter 40, 42, 50 is checked against a value of flow-rate of liquid set and considered as real reference value. In the case where (on account of variability of the components and/or of the production process spread) the value measured by the flow meter were not to correspond to the real reference value, it is possible to enter, in the control program of the controller of the device 1, a multiplying factor referred to as "calibration factor" so that the measurement with match correctly with the reference.

In practice, for example, the multiplying factor may be given by the ratio between the real reference value and the measured value (multiplying factor=real reference value/ measured value). Then, in normal use of the device 1, the signal at output from the on-board electronics will be corrected by the controller by multiplying the value measured by the non-mechanical flow meter by the multiplying factor (output signal=multiplying factor·measured value).

In addition or as an alternative, the parameter or parameters that can be written in the aforesaid non-volatile memory may comprise one or more of the parameters listed below.

1) "Power-down time"—In order to reduce to a minimum electrical consumption of the non-mechanical flow meter 40, 42, 50, the controller may be prearranged for interrupting supply to the meter itself between one measurement and the next. The time elapsing between two measurements may hence be adjustable, and for this purpose the parameter "power-down time" is envisaged. By increasing the value of the parameter "power-down time", the period of inactivity of the flow meter is lengthened, thus reducing consumption (which is particularly advantageous when the electronics on board the device is supplied via the aforesaid autonomous source). In this way, also the time elapsing between one reading and the next of the output signal of the flow sensor, typically referred to as "sampling rate", is lengthened. The parameter "power-down time" hence enables regulation of the sampling rate (number of readings per unit time) consistently with the requirements of the end user.

2) "Filter activation"—The control electronics of the flow meter can be prearranged for filtering the corresponding output signal in order to improve stability thereof. This is obtained via a common operation of a mathematical type, i.e., a mathematical processing of the values read, carried out prior to supply of the data at output from the device 1. The parameter "filter activation" enables activation or not of this operation. If this function is de-activated, the control electronics of the flow meter supplies at output the numeric values as read, without any processing.

3) "Filter parameters"—The filtering logic is preferably of an adaptive type; i.e., it presents at least two operating modes according to whether the oscillations of the signal to be filtered are small or large. Large signal oscillations correspond to extensive variations of flow-rate. This situation typically occurs upon opening/closing of the flow of water through the device 1. In these cases, it may be preferable for the signal to follow rapidly the variation of flow-rate, without filtering (i.e., without any mathematical processing) that may slow down variation thereof. The filter compares the value read with the previous one. If the difference between these values is greater than a parameter "high delta-flow-rate", the filter does not carry out any mathematical calculation, but supplies the value as read. Conversely, small signal oscillations typically correspond to electrical or fluid-dynamic disturbance, which causes variation in the value of the signal even if the flow-rate has not in actual fact varied. In this case, it is advantageous to envisage a mathematical calculation that will filter the small variations and supply a more stable signal value. Also in this case, the filter compares the value read with the previous one. If the difference between these values is less than a parameter "low delta-flow-rate", then the filter carries out the mathematical calculations with the purpose of averaging the values read, and hence supplying a more stable value.

4) "Time constant"—The mathematical calculations referred to in points 2) and 3) are carried out taking into account the parameter "time constant", which defines how many successive readings of flow-rate must be taken into account to calculate the filtered value (according to average-calculation formulas that may be of different types). In practice, a high value of the parameter "time constant" supplies a value that is more stable but that follows any possible variations of flow-rate more slowly.

5) "Flow-rate cut value"—This parameter is aimed at indicating a value of flow-rate of water that is very close to zero. Any value of flow-rate read by the non-mechanical meter that is less than the parameter "flow-rate cut value" is artificially forced to the zero numeric value. In this way, it is possible to neglect very small oscillations of the signal, which in practice do not give rise to a real flow-rate but in general are the result of electrical disturbance/noise.

6) "Zero transmission"—With this parameter (of a true/false type) it is defined whether the electronics on board the device 1 is to transmit or not the values of zero flow-rate. A preferable configuration from the standpoint of electrical consumption would be not to transmit the values of zero flow-rate. In this case, only in the presence of non-zero flow-rate would the electronics transmit an output signal, whereas in the absence of a detection of flow-rate it would not transmit any signal.

7) "Maximum volume"—Defined with this parameter is the volume or amount of liquid whereby, if it is reached or overstepped, the electronics on board the device 1 drives closing of the corresponding valve arrangement, i.e., supply of the corresponding electro-thermal actuator.

8) "Flow-rate threshold or thresholds"—These refer to the minimum value of flow-rate, or to the maximum value of flow-rate, or to both of the limit values (minimum and maximum) of a flow-rate range with respect to which the electronics on board the device 1 drives closing of the corresponding valve arrangement, i.e., supply of the corresponding electro-thermal actuator. As mentioned previously, in various embodiments, the device 1 can be programmed for triggering in the case where the flow-rate detected is lower than a predefined minimum value, or else is higher than a predefined maximum value.

As mentioned previously, the flow meter that equips a hydraulic control device according to the invention does not have necessarily to be an electromagnetic-induction sensor, it possibly being of some other non-mechanical type, in particular a hot-wire or hot-film flow meter.

Figure 19:
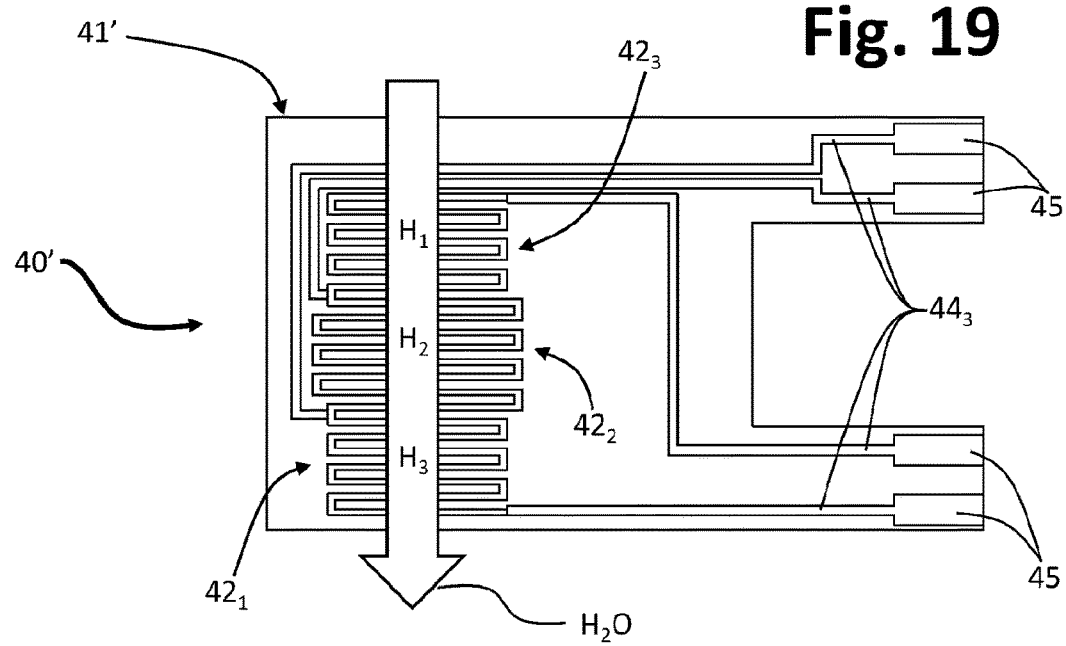
FIG. 19 is a schematic side elevation of a support belonging to a flow meter unit of a hydraulic control device according to further possible embodiments of the invention.
Figure 20:
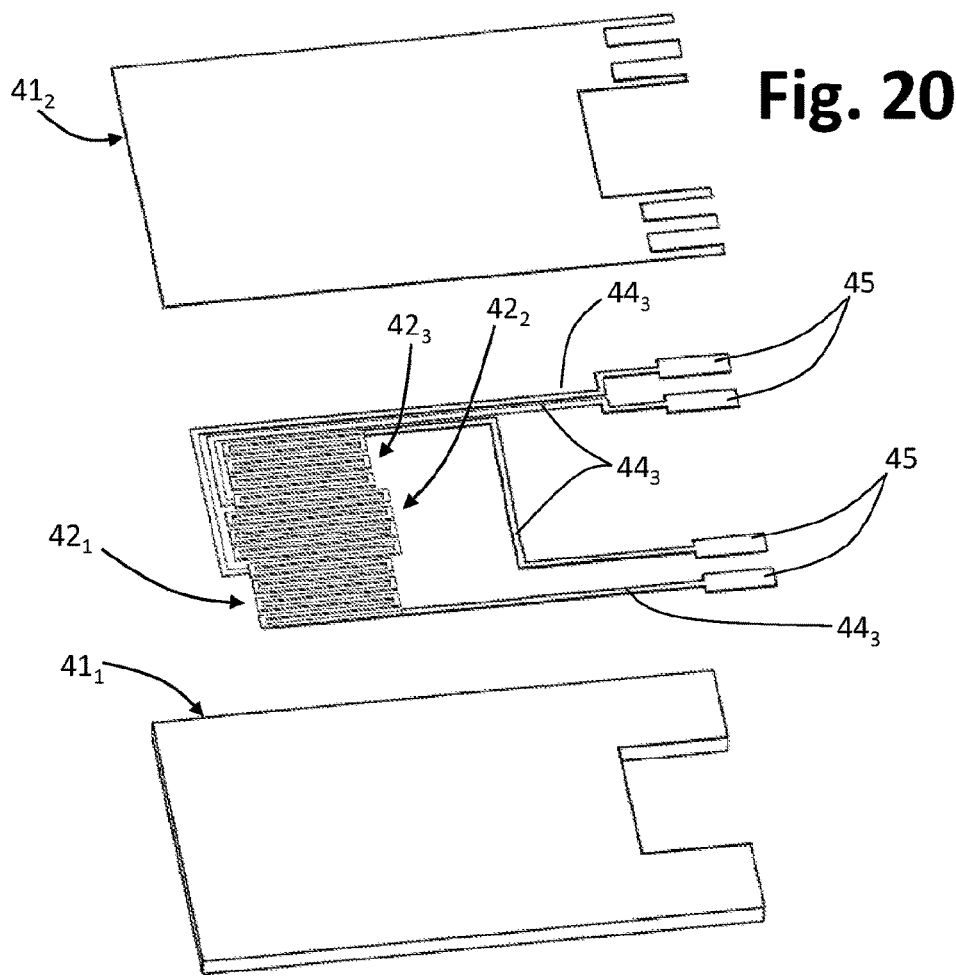
FIG. 20 is a schematic exploded view of the support of FIG. 19.

For example, FIGS. 19 and 20 illustrate a possible variant embodiment of a support that can be used in a hydraulic control device according to the invention, based upon the use of a hot-wire or hot-film flow meter, designated as a whole by 40'.

The meter 40' has a support, designated by 41' in FIG. 19, preferably of a planar type, which can be mounted on the body of the device 1 in a way similar to what has been described previously with reference to the support 41.

In various embodiments, such as the one exemplified, provided on the support 41' are three resistors, designated by $42_1$, $42_2$, and $42_3$ The three resistors are preferably arranged substantially aligned to one another according to the direction of height of the support 41', i.e., with reference to the mounted condition of the support 41', in the direction of the flow of water in the flow-rate detection area (DR, see the previous figures). In FIG. 22, the flow of water is indicated schematically by the arrow $H_2O$. As may be noted also in FIG. 20, the resistors $42_1$, $42_2$, and $42_3$ are defined by respective conductive tracks $44_3$ isolated from the liquid, the proximal ends of which provide the respective connection pads 45. The tracks 443 can be insulated, for example, via a further upper layer made of electrically insulating material, such as the one designated by $41_2$.

The central resistor $42_2$ provides the hot wire or hot film, in so far as it is prearranged so as to produce heat when supplied by electric current. The lateral or end resistors $42_1$ and $42_3$ modify, instead, their value of ohmic resistance on the basis of the temperature detected.

Assume that the support 41' is mounted in the detection region DR of the duct 30a-30b as illustrated in previous figures, instead of the support 41, and hence with the support 41' inserted in a transverse direction, with the intermediate portion of the support 41' which carries the resistors $42_1$, $42_2$, and $42_3$ that is hence within the duct for the liquid. The proximal end portion of the support 41', i.e., the corresponding connection pads 45, is/are electrically coupled to a PCB of the type as the one already designated by 25.

In the presence of the flow of water $H_2O$ in the duct 30, the resistors $42_1$ and $42_3$ are heated in an asymmetrical way by the heat produced by the resistor $42_2$; i.e., the temperature in the area designated by $H_1$ in FIG. 22 will be lower than the temperature in the area designated by $H_3$, the areas $H_1$ and $H_3$ being, respectively, upstream and downstream of the area $H_2$ in which heating by the resistor $42_2$ is induced. This difference in temperature, measured as difference of ohmic resistance of the resistors $42_1$ and $42_3$ will be proportional to the flow-rate of water. Conversely, in the case of zero flow-rate, the difference in temperature, i.e., in ohmic resistance of the resistors $42_1$ and $42_3$, is assumed as being zero.

Of course, in the case of a hot-wire or hot-film flow sensor, the electromagnetic arrangement 50 of the previous figures is not necessary, and the control logic of the system will be implemented for deriving the value of flow-rate on the basis of the ohmic difference detected.

As may be noted from FIG. 20, also the support 41' may have a multilayer structure, with a base layer $41_1$ defined on which are the tracks $44_3$ that define the resistors $42_1$, $42_2$, and $42_3$. Also in this embodiment, the base layer $41_1$ may be made of plastic material (for example, polycarbonate), or else a ceramic material, or else a composite material (for example, FR4). The tracks may be defined via the silk-screen printing technique or some other deposition technique, using, for example, inks with a base of a resistive material, such as silk-screen pastes with a base of coal or graphite, for the tracks $44_3$. These tracks and the corresponding resistors may be coated with a layer of electrically insulating material. It will be appreciated that the support 41' can be mounted in a transverse direction with respect to the duct 30, in a way similar to what has been described in relation to the support 41.

The hot-wire or hot-film flow-rate meter used in the device according to the invention could have a different structure, according to techniques in itself known.

From the above description, the characteristics of the present invention emerge clearly, as likewise do its advantages.

The hydraulic control device according to the invention, which envisages a non-mechanical flow meter, is advantageous as compared to the relevant prior art, based upon the use of mechanical meters with impellers and gears. The flow meters proposed enable in fact measurement of the flowrate—and hence the amount—of a liquid without the presence of moving parts, and hence present a greater reliability as compared to known mechanical technologies. These sensors are moreover able to measure even very low flowrates (of the order of millilitres per minute), which enables, for example, detection of minor leaks or dripping. The use of an electric actuator, in particular an actuator having an element made of shape-memory material, enables supply of a force sufficient for driving the valve arrangement of the device, which further reduces the risks of sticking. These risks are further reduced in the case of a structure of valve arrangement without gears and in which the number of parts in contact with the liquid is reduced. The use of an actuator of the type indicated also proves advantageous in view of its limited cost, of the reduction in the overall dimensions, and of the simplicity of control. The preferred use of a non-mechanical flow meter and an electro-thermal actuator moreover makes it possible to contain consumption of electrical energy by the device, which may in this way be supplied via a battery of a standard type. A further substantial advantage of the invention is that it enables resetting of the valve arrangement directly from outside the casing of the device, in particular from its front, without having to separate the device itself from the hydraulic system supplied thereby.

It is clear that numerous variations may be made by the person skilled in the branch to the hydraulic control device described by way of example, without thereby departing from the scope of the invention as defined in the ensuing claims.

As mentioned previously, in embodiments not represented, the control mechanism of the valve arrangement of the device according to the invention could be of a type different from the one previously exemplified and/or could be resettable via an actuator belonging to the mechanism itself. As has been said, moreover, the mechanism could be prearranged for its reset after prior disconnection from the source of the liquid or from the appliance or system supplied thereby.

The actuator element made of shape-memory alloy could be heated via a corresponding electrical heater device, instead of being supplied directly with electric current. Moreover, the actuator element could have a shape different from a wire and/or be prearranged to undergo deformation in a way different from what has been exemplified.

The device could be conceived for its supply via power mains. Also in variant embodiments of this type, on the other hand, it may be advantageous to equip the device with an auxiliary source of electrical energy, such as a backup battery, preferably rechargeable in order to ensure operation of the device itself even in the case of possible absence of the power mains.

Individual characteristics mentioned with reference to embodiments described previously may be combined together in other embodiments. Moreover, characteristics and functions indicated for the meter unit may be applied to the valve unit, and vice versa.

The invention claimed is:

1. A hydraulic control device for liquid-conducting appliances or systems, the device being designed for connection between a source of a liquid and an appliance or system using the liquid, the hydraulic control device comprising:

a device body having a duct for the liquid that extends between an inlet connector and an outlet connector;

a flow meter associated to the device body; and a valve arrangement associated to the device body, including a valve member, which is displaceable between an opening position and a closing position of the duct for the liquid, a mechanical control mechanism for controlling the valve member, and an electric actuator for driving the mechanical control mechanism, wherein the mechanical control mechanism is switchable in function of a detection carried out by the flow meter, for purposes of displacement of the valve member from the opening position to the closing position of the duct for the liquid, wherein the flow meter is a non-mechanical flow meter which includes at least two electrical detection elements reachable by liquid that flows in the duct for the liquid, wherein the valve member is inserted within the duct for the liquid and is movable therein in a direction that is axial to at least part of the duct itself, between a spaced-apart position and a resting position with respect to a valve seat, the valve seat being defined in a position of the duct for the liquid that is intermediate between the inlet connector and the outlet connector of device body, wherein the mechanical control mechanism comprises a retention element for withholding the valve member in the respective opening position, which is associated to, or formed by, a first control element that extends in a transverse direction in the duet for the liquid, wherein the mechanical control mechanism comprises a second control element, which is associated in a movable way to the first control element on the outside of the duct for the liquid, the second control element being able to interact with a respective third control element, and wherein the third control element can be driven via the electric actuator to assume a respective condition of release of the second control element, and thereby enable a movement of the first control element and/or of the retention element towards a respective position of release the valve member.

2. The device according to claim 1, further comprising an autonomous electrical-supply source, and a circuit arrangement for control of the electrical supply of the non-mechanical flow meter and of the electric actuator.

3. The device according to claim 1, wherein the electric actuator is a thermoelectric actuator that comprises an actuator element made at least in part of a shape-memory alloy and/or an actuator element which is wire-shaped.

4. The device according to claim 1, wherein the non-mechanical flow meter comprises at least one support of at least one of said electrical detection elements.

5. The device according to claim 4, wherein the at least one support is at least partially inserted in the duct for the liquid or faces the inside thereof, in such a way that the at least one electrical detection element is reachable by the liquid.

6. The device according to claim 1, wherein the non-mechanical flow meter is an electromagnetic-induction flow meter or else a hot-wire or hot-film flow meter.

7. The device according to claim 6, wherein the non-mechanical flow meter is an electromagnetic-induction flow meter that comprises at least:
an electromagnetic arrangement, prearranged for generating an electromagnetic field in a direction transverse to a direction of a flow of the liquid in the duct for the liquid; and
a detection arrangement, comprising at least two electrodes for detecting a potential difference induced by the flow of the liquid through said electromagnetic field, the at least two electrodes providing said at least two electrical detection elements, and/or being both on one and the same support that is inserted in the duct for the liquid or faces the inside thereof.

8. The device according to claim 6, wherein the flow meter is a hot-wire or hot-film flow meter that comprises at least two electrical detection elements or resistors on at least one support, arranged according to a direction of the flow of the liquid in the duct for the liquid.

9. The device according to claim 8, wherein the hot-wire or hot-film flow meter comprises at least one first resistor, prearranged for producing heat when supplied by electric current, and at least one second resistor, upstream and/or downstream of the first resistor with reference to the direction of the flow of the liquid, designed to vary a value of ohmic resistance thereof on the basis of a detected temperature.

10. The device according to claim 1, wherein the duct for the liquid has a detection region, at which the non-mechanical flow meter is installed, the section of passage of the duct for the liquid varying upstream and/or downstream of the detection region.

11. The device according to claim 1, wherein:
the mechanical control mechanism is switchable by the electric actuator from a condition of retention to a condition of release of the valve member, for purposes of displacement of the valve member from the opening position to the closing position of the duct for the liquid, respectively;
the mechanical control mechanism comprises a mechanical reset member, operable by a user to bring the control mechanism from the condition of release back into the condition of retention of the valve member; and
the mechanical reset member is configured for being operable from the outside of the device body and/or of an outer casing of the device, without any need to disconnect the inlet connector and the outlet connector from the source of the liquid and from the appliance or system using the liquid, respectively.

12. The device according to claim 1, wherein:
the mechanical control mechanism comprises a mechanical reset member, operable by a user to bring the control mechanism from the condition of release back into the condition of retention of the valve member; and
the mechanical reset member is mounted for moving with the second control element.

13. The device according to claim 1, wherein the at least two electrical detection elements are within, or face the inside of, the duct for the liquid.

14. The device according to claim 1, wherein at least one of the first control element and the second control element is subjected to the elastic reaction of a first elastic element, and the third control element is subjected to the elastic reaction of a second elastic element.

15. A hydraulic control device for liquid-conducting appliances or systems, the device being designed for connection between a source of a liquid and an appliance or system using the liquid, the hydraulic control device comprising:
a device body having a duct for the liquid that extends between an inlet connector and an outlet connector;
a flow meter associated to the device body; and
a valve arrangement, which is associated to the device body and includes a valve member, which is displaceable between an opening position and a closing position of the duct for the liquid, and a mechanical control mechanism for controlling the valve member,
wherein the mechanical control mechanism is switchable in function of a detection carried out by the flow meter from a retention condition to a release condition of the valve member, for enabling displacement of the valve member from the opening position to the closing position of the duct for the liquid, respectively,
wherein the valve arrangement comprises a thermoelectric actuator, which includes at least one wire-shaped actuator element made at least in part of a shape-memory material,
wherein the mechanical control mechanism comprises a plurality of interacting mechanical control elements mounted movable on the device body,
wherein in the retention condition the plurality of interacting mechanical control elements are in first relative positions such that the valve member is withheld in the respective opening position in absence of an electric current to the thermoelectric actuator,
wherein the plurality of interacting mechanical control elements comprise a lever which is angularly movable for causing the plurality of interacting control elements to assume second relative positions in the release condition, which enable passage of the valve member from the opening position to the closing position,
wherein the thermoelectric actuator has a first end anchored to the device body and a second end anchored to the lever, in such a way that an electric current supplied to the thermoelectric actuator causes a contraction of the at least one wire-shaped actuator element thereof, to produce an angular movement of the lever which triggers passage of the mechanical control mechanism from the retention condition to the release condition.

16. The device according to claim 15, wherein the lever is subjected to the elastic reaction of an elastic element.

17. The device according to claim 15, wherein the plurality of interacting mechanical control elements comprise a retention member, configured for withholding the valve member in the respective opening position, the retention member being movable according to an axis substantially perpendicular to a direction of displacement of the valve member between the opening position and the closing position of the duct for the liquid.

18. A hydraulic control device for liquid-conducting appliances or systems, the device being designed for connection between a source of a liquid and an appliance or system using the liquid, the hydraulic control device comprising:
a device body having a duct for the liquid that extends between an inlet connector and an outlet connector;
a flow meter associated to the device body;
a valve arrangement, which is associated to the device body and includes a valve member, which is displaceable between an opening position and a closing position of the duct for the liquid, a mechanical control mechanism for controlling the valve member, and an electric actuator for driving the mechanical control mechanism, and optionally an outer casing that encloses at least a part of the device body associated to which is the mechanical control mechanism for controlling the valve member, wherein the mechanical control mechanism is switchable in function of a detection carried out by the flow meter from a retention condition to a release condition of the valve member, for purposes of displacement of the valve member from the opening position to the closing position of the duct for the liquid, wherein the mechanical control mechanism comprises a plurality of interacting mechanical control elements which are mounted movable on the device body, wherein the retention condition the plurality of interacting mechanical control elements are in first relative positions such that the valve member is withheld in the respective opening position in absence of an electric current to the electric actuator, wherein the electric current supplied to the electric actuator causes the plurality of interacting mechanical control elements to assume second relative positions which enable the valve member to pass to the closing position thereof, wherein the mechanical control mechanism moreover comprises a mechanical reset member, which is operable by a user while the electric current is not being supplied to the electric actuator and the plurality of interacting mechanical control elements are in the second relative positions, to mechanically restore the first relative positions of the plurality of interacting mechanical control elements so as to bring the mechanical control mechanism from the release condition back into the retention condition of the valve member, and wherein the mechanical reset member is configured for being mechanically operable from the outside of the device body and/or of the possible outer casing of the device while the electric current is not being supplied to the electric actuator, without any need to disconnect the inlet connector and the outlet connector from the source of the liquid and from the appliance or system using the liquid, respectively.

19. The device according to claim 18, wherein the plurality of interacting mechanical control elements comprise:

a retention member configured for withholding the valve member in the respective opening position, and a lever operable for causing passage of the mechanical retention element to a respective operating position in which the valve member is enabled to pass to the respective closing position, wherein the electric current supply to the electric actuator causes the electric actuator to produce an angular movement of the lever, which determines as a consequence passage of the retention element to the respective releasing position.

20. The device according to claim 19, wherein the lever is subjected to the elastic reaction of an elastic element.

* * * * *